United States Patent
Angeles et al.

(10) Patent No.: US 7,127,962 B2
(45) Date of Patent: Oct. 31, 2006

(54) FOUR-DEGREE-OF-FREEDOM PARALLEL MANIPULATOR FOR PRODUCING SCHÖNFLIES MOTIONS

(75) Inventors: Jorge Angeles, Montréal (CA); Alexei Morozov, Verdun (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 11/123,056

(22) Filed: May 6, 2005

(65) Prior Publication Data

US 2005/0262959 A1    Dec. 1, 2005

Related U.S. Application Data

(63) Continuation of application No. PCT/CA03/01695, filed on Nov. 5, 2003.

(60) Provisional application No. 60/424,393, filed on Nov. 6, 2002, now abandoned.

(51) Int. Cl.
    *B25J 17/00*    (2006.01)
(52) U.S. Cl. ............... 74/490.05; 74/490.03; 901/16
(58) Field of Classification Search ............ 74/490.01, 74/490.03, 490.05; 901/14, 16, 28
    See application file for complete search history.

(56) References Cited

U.S. PATENT DOCUMENTS

| 4,437,635 | A |   | 3/1984  | Pham |
| 4,610,598 | A |   | 9/1986  | Hamada et al. |
| 4,782,726 | A |   | 11/1988 | Ryder et al. |
| 4,976,582 | A |   | 12/1990 | Clavel |
| 5,397,323 | A |   | 3/1995  | Taylor et al. |
| 5,419,674 | A |   | 5/1995  | Chang |
| 5,536,135 | A |   | 7/1996  | Robertson |
| 5,746,093 | A |   | 5/1998  | Poglitsch |
| 5,931,832 | A |   | 8/1999  | Jensen |
| 6,047,610 | A | * | 4/2000  | Stocco et al. ............ 74/479.01 |
| 6,095,011 | A |   | 8/2000  | Brogårdh |
| 6,301,988 | B1|   | 10/2001 | Brogårdh |
| 6,336,374 | B1|   | 1/2002  | Brogårdh |
| 6,412,363 | B1| * | 7/2002  | Brog.ang.rdh ........... 74/490.05 |
| 6,516,681 | B1| * | 2/2003  | Pierrot et al. ............ 74/490.01 |

(Continued)

FOREIGN PATENT DOCUMENTS

EP    1 084 802    3/2001

(Continued)

OTHER PUBLICATIONS

J. Angeles, A. Morozov, O. Navarro: "A novel manipulator architecture for the production of SCARA motions" Proceedings of the 2000 IEEE International Conference on Robotics and Automation, San Francisco, Apr. 24-28, 2000, vol. 3, Apr. 2000, pp. 2370-2375 . . . .

(Continued)

*Primary Examiner*—David Fenstermacher
(74) *Attorney, Agent, or Firm*—Ogilvy Renault LLP

(57) ABSTRACT

The present invention relates to a manipulating device (A) for producing Schönflies motions comprising a parallel array of at least two legs (B), each leg (B) including an actuator unit (C) having first and second ends and producing a pan-tilt motion, each leg (B) also including a passive unit (D) having first and second ends, the first end of the passive unit (D) being coupled to the first end of the actuator unit (C) such that the passive unit (D) reacts to the pan-tilt motion, a base (1) connected to the second end of each actuator unit (C), all second ends having a constant relative position with respect to one another; and a common end-effector (36) connected to the second end of all passive units (D) such that the common end-effector (36) is provided with a Schönflies motion by the legs (B).

34 Claims, 25 Drawing Sheets

U.S. PATENT DOCUMENTS

| | | | |
|---|---|---|---|
| 6,577,093 B1 * | 6/2003 | Hvittfeldt et al. | 318/568.11 |
| 6,729,202 B1 * | 5/2004 | Gosselin et al. | 74/490.05 |
| 6,841,964 B1 * | 1/2005 | Osuka et al. | 318/568.21 |
| 6,997,669 B1 * | 2/2006 | Kong et al. | 414/735 |

FOREIGN PATENT DOCUMENTS

RU            921848            9/1986

OTHER PUBLICATIONS

Arai T et al: "Development of 3 DOF micro finger" Intelligent Robots and Systems '96, IROS 96, Proceedings of the 1996 LEEE/RSJ International Conference on Osaka, Japan, Nov. 4-8, 1996, New York, NY, USA, IEEE, US, Nov. 4, 1996, pp. 981-987 . . . .

Rolland, vol. 67, pp. 831-844 of ASME Journal Dynamic Systems and Control Division, 1999.

Yang et al., "Structure Synthesis of a 4-dof (3-translation and 1-rotation) Parallel Robot Mechanisms Based on the Units of Single-Opened-Chain", Proceedings of the ASME 2001 Design Engineering Technical Conference and Computers and Information in Engineering Conference, DETC2001/DAC-21131, Pittsburg, PA, U.S.A.

* cited by examiner

FOUR-DEGREE-OF-FREEDOM PARALLEL MANIPULATOR FOR PRODUCING SCHÖNFLIES MOTIONS

RELATED APPLICATIONS

This is a continuation of International Patent Application No. PCT/CA2003/001695 filed Nov. 5, 2003, which claims benefit of U.S. Provisional Patent Application No. 60/424,393 filed on Nov. 6, 2002, now abandoned.

BACKGROUND OF THE INVENTION

1. Field of the Invention

The present invention relates to a manipulating device aiming at the production of four-degree-of-freedom displacements of a rigid body.

2. Description of the Prior Art

Four-degree-of-freedom displacements were first studied by the German mathematician-mineralogist Arthur Moritz Schönflies (1853–1928), who found that these displacements have the algebraic structure of a group. For this reason, the set of such motions is known to geometers as the Schönflies subgroup of the group of rigid-body displacements. A familiar instance of Schönflies motions is found in the motions undergone by the tray of a waiter: the tray is free to move in all directions, but is prevented from tilting. The displacements comprise three independent translations and one rotation about an axis of fixed orientation with respect to a fixed base.

Schönflies motions are suitable for assembly tasks of the type occurring in the electronics industry. In these tasks, electronic chips having a flat geometry are picked up from a magazine, where they lie in a planar array. The chips are then placed on an electronic board in a planar array as well, the two planes involved being parallel but lying at different levels, the arrays thus having different orientations. These tasks require free translations in the three directions of space plus one free rotation about an axis of orientation fixed with respect to the plane of the magazine. The mechanism realizing these tasks must therefore exhibit a very large stiffness against rotations about two axes normal to the axis of rotation. These features motivate the name SCARA for this type of devices: Selective-Compliance Assembly Robot Arm.

Schönflies-motion generators, or SCARA systems, are not new. The Russian Patent SU921848 of Sep. 25, 1980 to Zharkov et al., discloses a redundant manipulating device that can be used for the generation of Schönflies motions, but through a serial layout of links and motors.

U.S. Pat. No. 4,610,598 issued on Sep. 9, 1986 to Hamada et al. discloses an industrial robot implementing Schönflies motions. The industrial robot has a kinematic chain of a serial manipulator, with the four axes of the Schönflies motions being actuated by motors traveling with the moving links. This mounting of the motors on the moving links imposes a high inertia load on the links, bringing about a low load-carrying capacity and a high flexibility of the structure. The high flexibility prevents high-speed operations because these operations induce structural resonance in flexible structures. As opposed to a serial layout, current industrial trends point at parallel arrays because they allow for a placement of the motors on a fixed base, thereby allowing for lighter, stiffer, and hence, faster structures.

A parallel array of serial chains producing individually Schönflies motions are found in U.S. Pat. No. 4,976,582 issued on Dec. 11, 1990, to Clavel, and in EP patent EP1084802 issued on Mar. 21, 2001, to Company et al., as well as in a number of similar devices appearing in the technical literature. The outcome of the patent to Company et al., like that to Clavel, is that the coordinated motion of various legs coupled to a common moving platform is lacking the rotation required in a Schönflies motion, because the rotations of the Schönflies motions of the individual legs are incompatible since their axes of rotation are nonparallel. In order to produce Schönflies motions of axis normal to all four motor axes, which are all parallel to a given plane, Company et al. resort to a planar linkage carrying the moving platform that hence undergoes Schönflies motions. Various embodiments of this invention have been reported in the Proceedings of the IEEE International Conference of Robotics and Automation in 2001, 2002, and 2003.

U.S. Pat. No. 6,095,011 issued on Aug. 1, 2000, and U.S. Pat. No. 6,301,988 issued on Oct. 16, 2001, both to Brogårdh, disclose devices intended to enhance Clavel's patent by having an axis of rotation normal to the coplanar axes of the Schönflies motions of the legs. However, none of these two inventions provides four degrees of freedom of the Schönflies type.

U.S. Pat. No. 6,336,374 issued on Jan. 8, 2002, to Brogårdh, discloses an improved version of his previous patents, providing for translations in three directions, as well as rotation around one of the axes. Here, the rotation is provided with a separate motor, installed on a first link of a manipulator with a long and intricate transmission between the motor and the rotating device. In a four-degree-of-freedom embodiment, two motors are installed on a base of the structure, and two are installed on a moving link. Thus, this embodiment represents a relatively complex, heavy and, consequently, slow device.

Several U.S. patents, namely, U.S. Pat. No. 4,437,635 issued on Mar. 20, 1984, to Pham; U.S. Pat. No. 5,746,093 issued on May 5, 1998, to Poglitsch; U.S. Pat. No. 5,397,323 issued on Mar. 14, 1995, to Taylor et al.; U.S. Pat. No. 5,419,674 issued on May 30, 1995 to Chang; U.S. Pat. No. 4,782,726 issued on Nov. 8, 1988 to Ryder et al.; and U.S. Pat. No. 5,931,832 issued on Aug. 3, 1999, to Jensen, disclose a variety of devices, all based on two serial parallelogram linkages, moving in the same plane, thus providing planar two-degree-of-freedom motion. Some of the foregoing inventions provide also additional motion of a base with the help of an additional motor. None of these inventions provides four-degree-of-freedom motions of the Schönflies type.

U.S. Pat. No. 5,536,135 of Jul. 16, 1996 to Robertson discloses a serial device with two orthogonal parallelogram-arrays, but only with two drives, thus allowing for two-degree-of-freedom translations with constant orientation of a tool.

Two four-degree-of-freedom parallel mechanisms, by Rolland, are described in Vol. 67, pp. 831–844 of ASME Journal Dynamic Systems and Control Division, of 1999. These two devices provide Schönflies motions. In one of these mechanisms, dubbed Kanuk, the author suggests to use four linear motors driving lower ends of links along rails. The second mechanism, dubbed Manta, uses three linear motors also driving the lower ends of links along the rails, and a fourth rotation motor installed on one of the links. These two devices thus need a very large space for installation and motion of the legs, providing at the same time a rather small workspace.

Finally, 50 parallel mechanisms capable of generating Schönflies motions were disclosed by Yang et al. in "Structure Synthesis of a 4-dof (3-translation and 1-rotation)

Parallel Robot Mechanisms Based on the Units of Single-Opened-Chain", Proceedings of the ASME 2001 Design Engineering Technical Conferences and Computers and Information in Engineering Conference, DETC2001/DAC-21151, Pittsburgh, Pa., U.S.A. Some of the mechanisms disclosed have legs with a single parallelogram, and the other mechanisms have a configuration without any parallelograms.

SUMMARY OF THE INVENTION

It is therefore an aim of the present invention to provide a new manipulating device capable of producing Schönflies, or SCARA, motions.

It is another aim of the present invention to provide a new manipulating device in which motors driving links thereof are fixed to a base so that moving parts can be lighter, thereby allowing for higher velocities and accelerations of an end-effector, a moving platform undergoing Schönflies motions.

It is yet another aim of the present invention to provide a new manipulating device in which four independent motions are produced by motors resting on a base thereof, the motions being transmitted from the motors to an end-effector of the device by at least two legs.

It is a further aim of the present invention to provide a new manipulating device which is capable of producing the motions of SCARA systems with a simple, fully-parallel structure that allows for high operational speeds in order to maximize production throughput.

It is an additional aim of the present invention to provide a new manipulating device that is capable of producing the motions of SCARA systems with a relatively simple parallel structure including as few as two legs, thereby reducing a likelihood of link-interference.

It is another aim of the present invention to provide a device which can be used in the electronics industry and in any other application where high-speed pick-and-place operations are needed, such as in packaging and bottling, the device producing translations in three directions and rotation about an axis of fixed direction.

It is a further aim of the present invention to provide a new manipulating device with four degrees of freedom which can be used in the design of virtual-axis machine tools upon mounting of a workpiece on a rotating table, common in the industry, to provide a fifth degree of freedom.

Therefore, in accordance with the present invention, there is provided a manipulating device for producing Schönflies motions comprising a parallel array of at least two legs, each leg including an actuator unit having first and second ends and producing a pan-tilt motion, each leg also including a passive unit having first and second ends, the first end of the passive unit being coupled to the first end of the actuator unit such that the passive unit reacts to the pan-tilt motion, a base connected to the second end of each actuator unit, all second ends having a constant relative position with respect to one another, and a common end-effector connected to the second end of all passive units such that the common end-effector is provided with a Schönflies motion by the legs, the Schönflies motion being composed of three independent translations and one rotation about an axis of fixed orientation.

Further in accordance with the present invention, there is provided a manipulating device for imparting a four-degree-of-freedom motion to an end-effector, the four-degree-of-freedom motion being composed of three independent translations and one rotation about a first axis of fixed orientation, the manipulating device comprising a parallel array of at least two legs attached to the end-effector, each leg including an actuator unit serially coupled to a passive unit, each actuator and passive units including a turntable adapted to experience a rotation about a second axis parallel to the first axis, each actuator and passive units also including a swing member having a first end attached to the turntable and being adapted to experience a tilt motion so that a second end of the swing member is translated along a perimeter of an imaginary circle lying in a plane parallel to the second axis, and each actuator unit being provided with actuating means to provide the rotation of the turntable thereof and the tilt motion of the swing member thereof such as to produce an actuator motion, the actuator motion of each actuator unit causing a passive motion of the passive unit coupled thereto, the passive motion of the passive unit being composed of the rotation of the turntable thereof and the tilt motion of the swing member thereof, such that a combination of the actuator motion with the passive motion produces a leg motion for the corresponding leg, whereby a combination of the leg motions imparts the four-degree-of-freedom motion to the end-effector.

BRIEF DESCRIPTION OF THE DRAWINGS

Having thus generally described the nature of the present invention, reference will now be made to the accompanying drawings, showing by way of illustration a few preferred embodiments thereof and in which.

DESCRIPTION OF THE PREFERRED EMBODIMENTS

Figure 1:
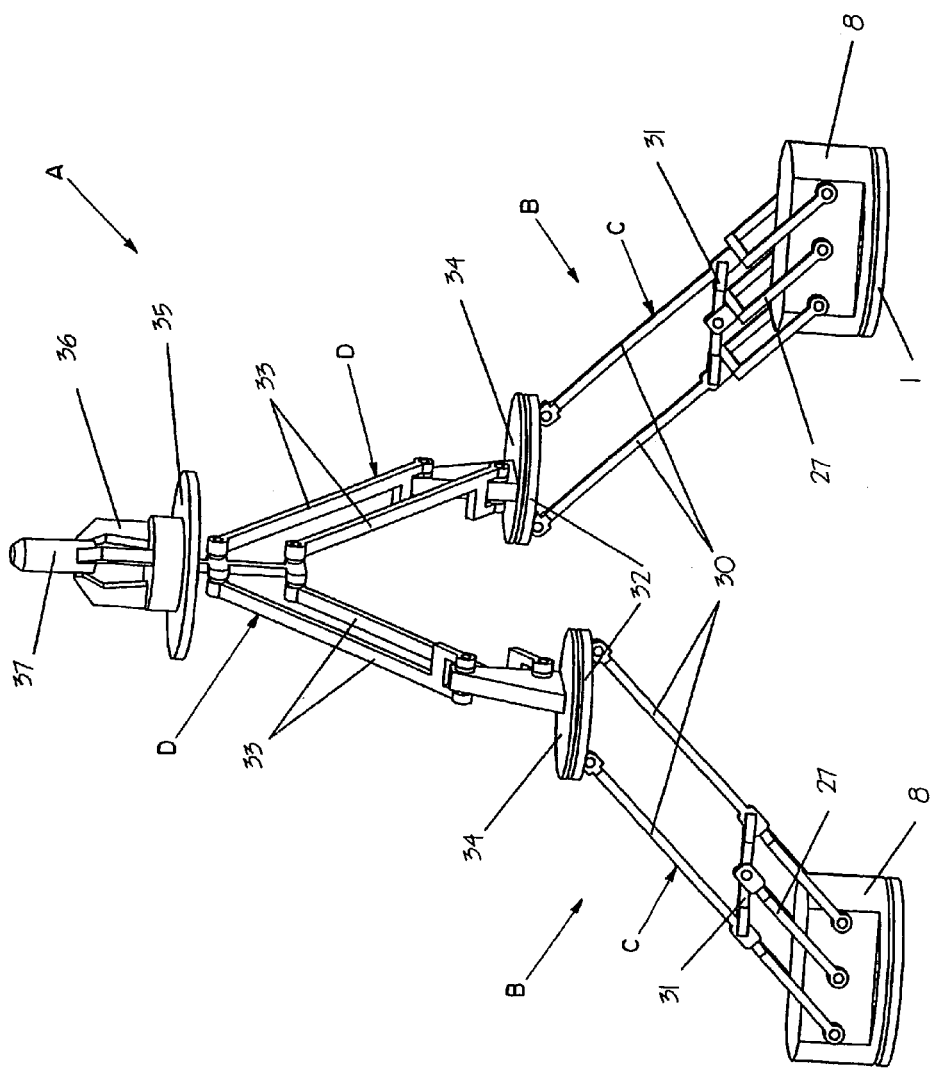
FIG. 1 is a perspective view of a first embodiment in accordance with the present invention, which is characterized by two legs coupling an end-effector to a base, each leg comprising an active and a passive parallelogram linkage with mid-planes of all passive linkages being parallel, each leg also being driven by a pair of motors mounted on the base.

FIG. 1 illustrates a preferred embodiment of the present invention wherein a manipulating device A generally comprises two identical four-degree-of-freedom serial legs B arranged in a parallel array. Each leg B has a base 1 and all legs B share one common end-effector, namely moving platform 35. All bases 1 are fixed relatively to one another. It is also contemplated to have a manipulating device A having more than two legs B, as will be seen further below. In any case, each leg B comprises an actuator unit C serially connected to a passive unit D, each passive unit D being a non-actuated version of the actuator unit C. All legs B produce Schönflies displacements of identical directions. The direction of a set of Schönflies displacements is the direction of the axis of the unique rotation comprised therein. The intersection of all Schönflies displacements forms a Schönflies subgroup having a direction identical to the direction of the individual Schönflies displacements.

More specifically, the actuator unit C and the passive unit D of each leg B each produces a set of two-degree-of-freedom displacements: one pan motion, or rotation about an axis parallel to a line L fixed to the base 1 of the leg B, and one tilt motion, or translation along a circle lying in a plane parallel to L (see FIG. 2–3), both combining to produce a pan-tilt motion. While the axes of rotation of the two units C,D are both parallel to L, and hence, parallel to each other and to the axis of the rotation of the moving platform 35, the axes translate independently, keeping their orientations fixed. Moreover, the planes of the two circles make a dihedral angle of variable magnitude.

Figure 2:
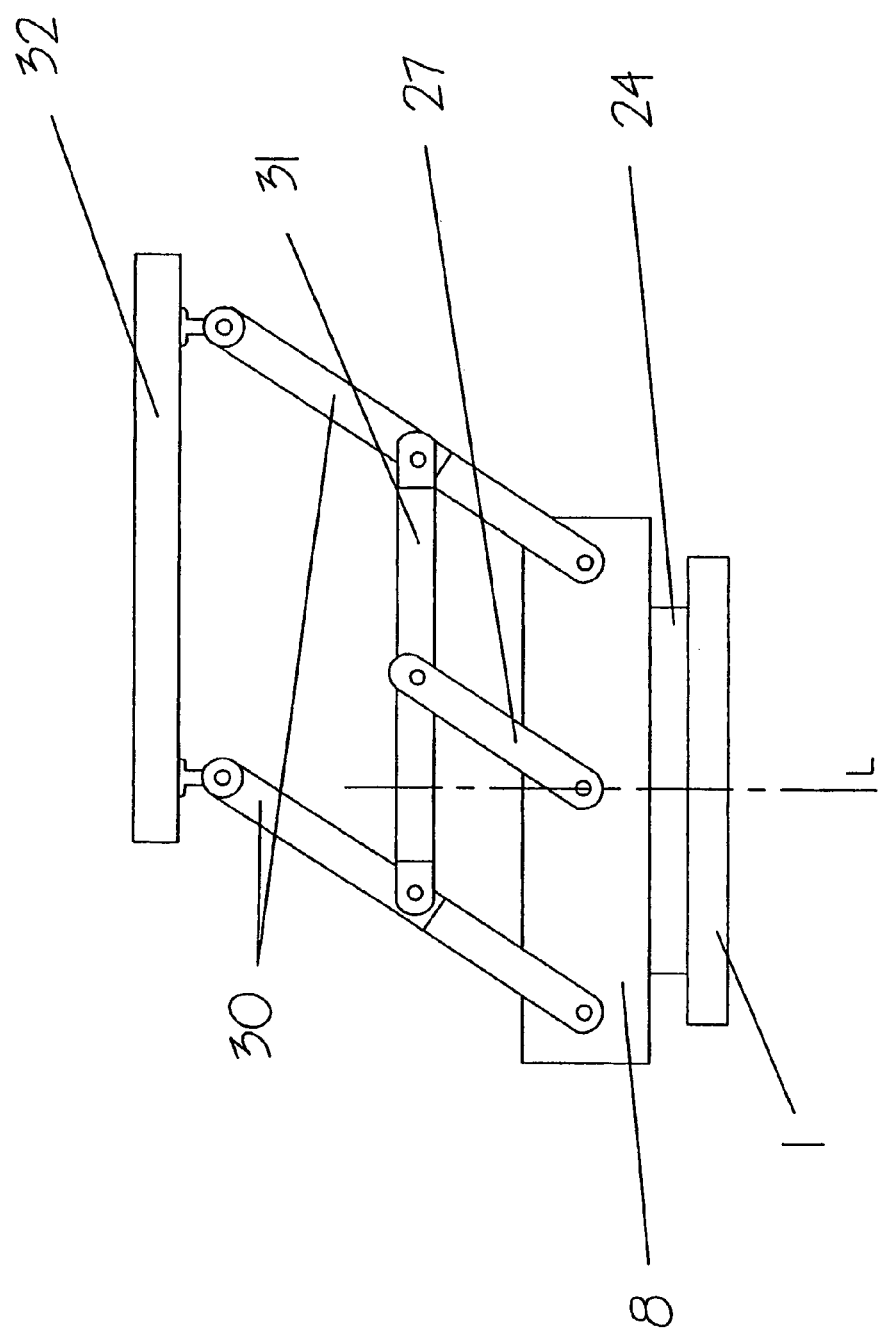
FIG. 2 is a front view of a layout of a transmission providing a pan-tilt motion through parallel driving links to each active parallelogram linkage in the embodiment of FIG. 1.
Figure 3:
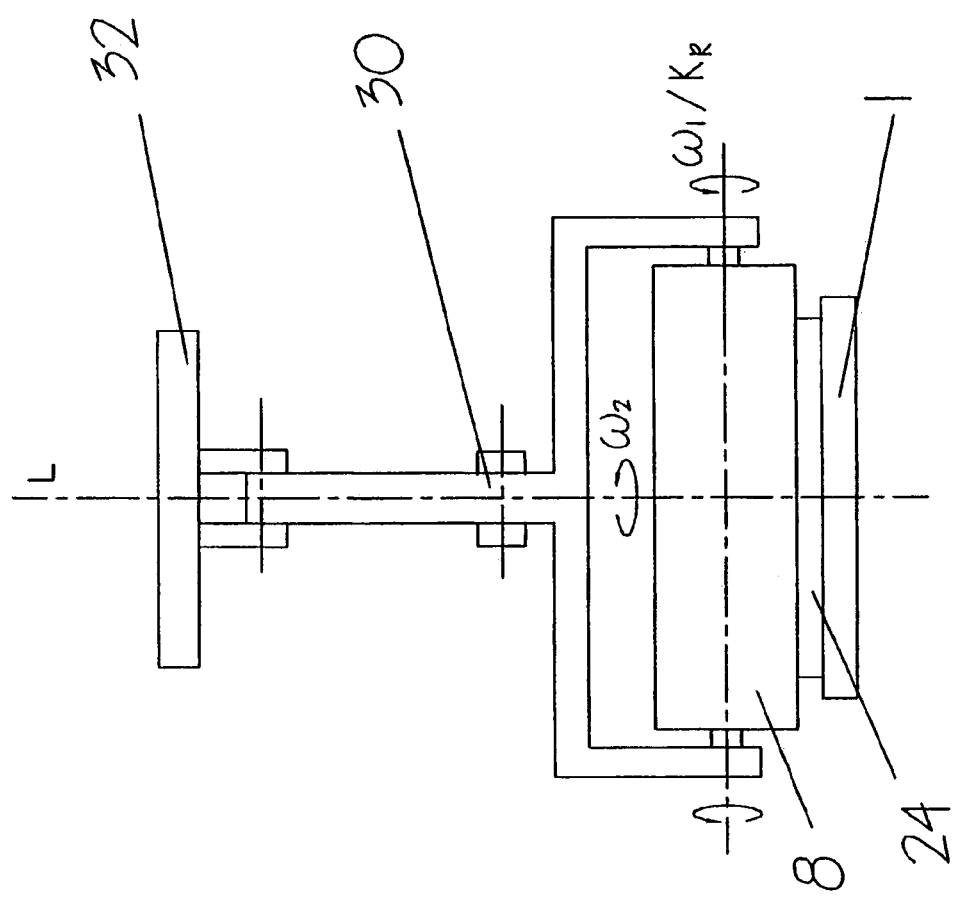
FIG. 3 is a side view of the layout of FIG. 2.
Figure 4:
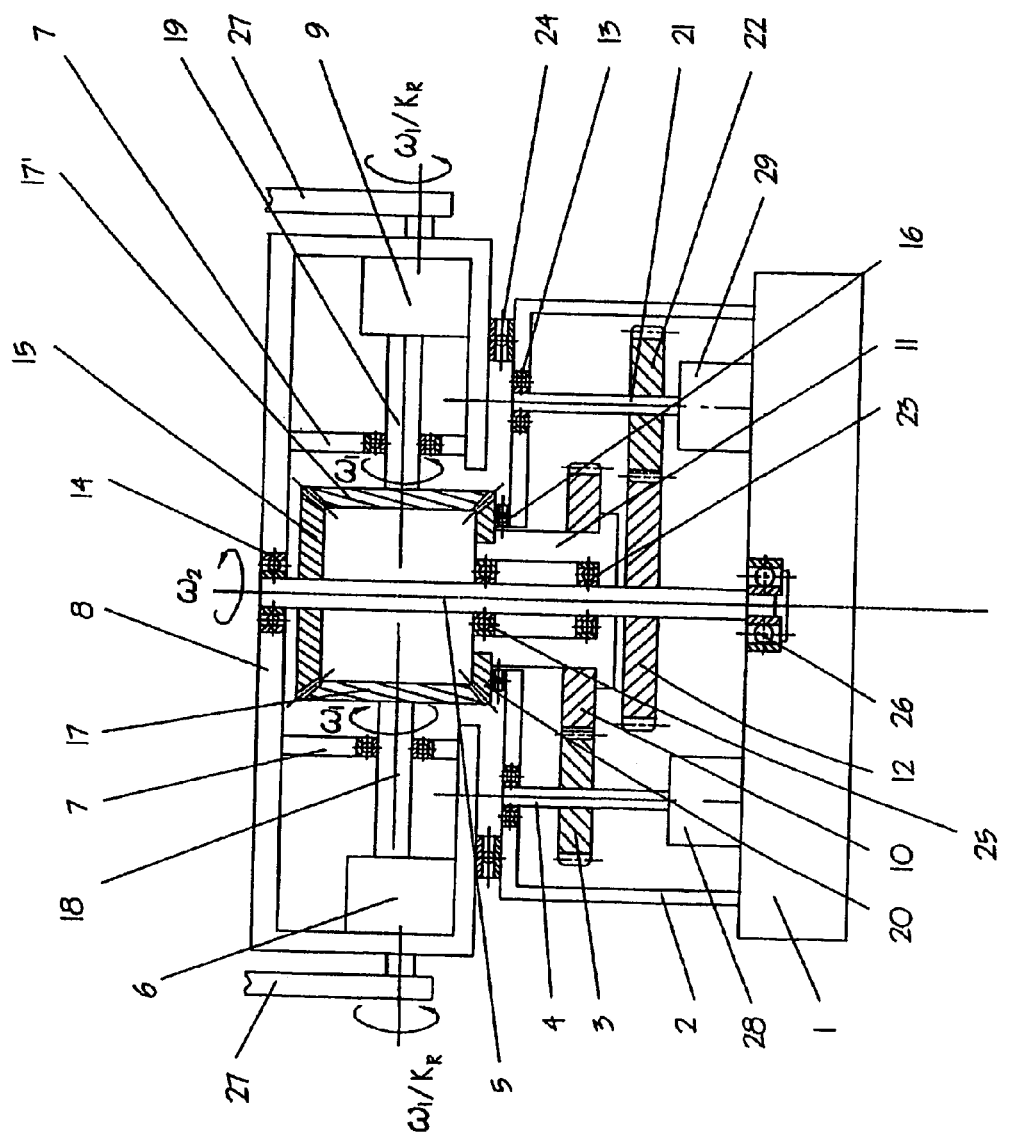
FIG. 4 is a cross-section view of a differential mechanism in one leg in the embodiment of FIG. 1, showing gear trains between the pair of motors and two output rotations, namely a rotation of a housing around a vertical axis thereof, and a rotation of two horizontal shafts driving the active parallelogram linkage.

As shown in FIG. 4, each actuator unit C comprises the base 1 linked to a support frame 2. A rotating housing 8 is rotatable similarly to a turntable, thereby producing the pan motion, by being rotatively mounted on the support frame 2 and supported by thrust bearings housed in a thrust bearing housing 24. As shown in FIG. 2, each actuator unit C further includes a driving link 27 operatively connected to an active parallelogram linkage 30 via a coupler link 31, so that the active parallelogram linkage 30 can act as a tilt or swing member. Likewise, as shown in FIG. 1, each passive unit D comprises a base 32 mounted at the distal end of the active parallelogram linkage 30, a passive rotating housing 34 supported on the base 32 and also acting as a turntable with respect thereto, and a passive parallelogram linkage 33 linked to the rotating housing 34 and acting as a swing member. Each of the identical actuator units C is therefore coupled to its companion passive unit D, both units C,D being capable of tilt motion through the parallelogram linkages 30,33 and of pan motion through the rotating housings 8,34. The bases 32 of the two passive units D are kept horizontal by virtue of the active parallelogram linkages 30 of the actuator units C; their parallelogram linkages 33, in turn, keep horizontal the common platform 35, to which both passive parallelogram linkages 33 are coupled by means of pin joints.

Thus, the passive units D react to the motions of the actuator units C, the manipulating device A providing as a result a four-degree-of-freedom motion to the moving platform 35: three translations and one rotation about one axis of fixed orientation. The manipulating device A provides a manipulation system with a horizontal end-effector (the moving platform 35) having the motion capability of a SCARA leg, thereby giving such a motion to a gripper 36 installed on the moving platform 35 and grasping rigidly a workpiece or tool 37.

Figure 5:
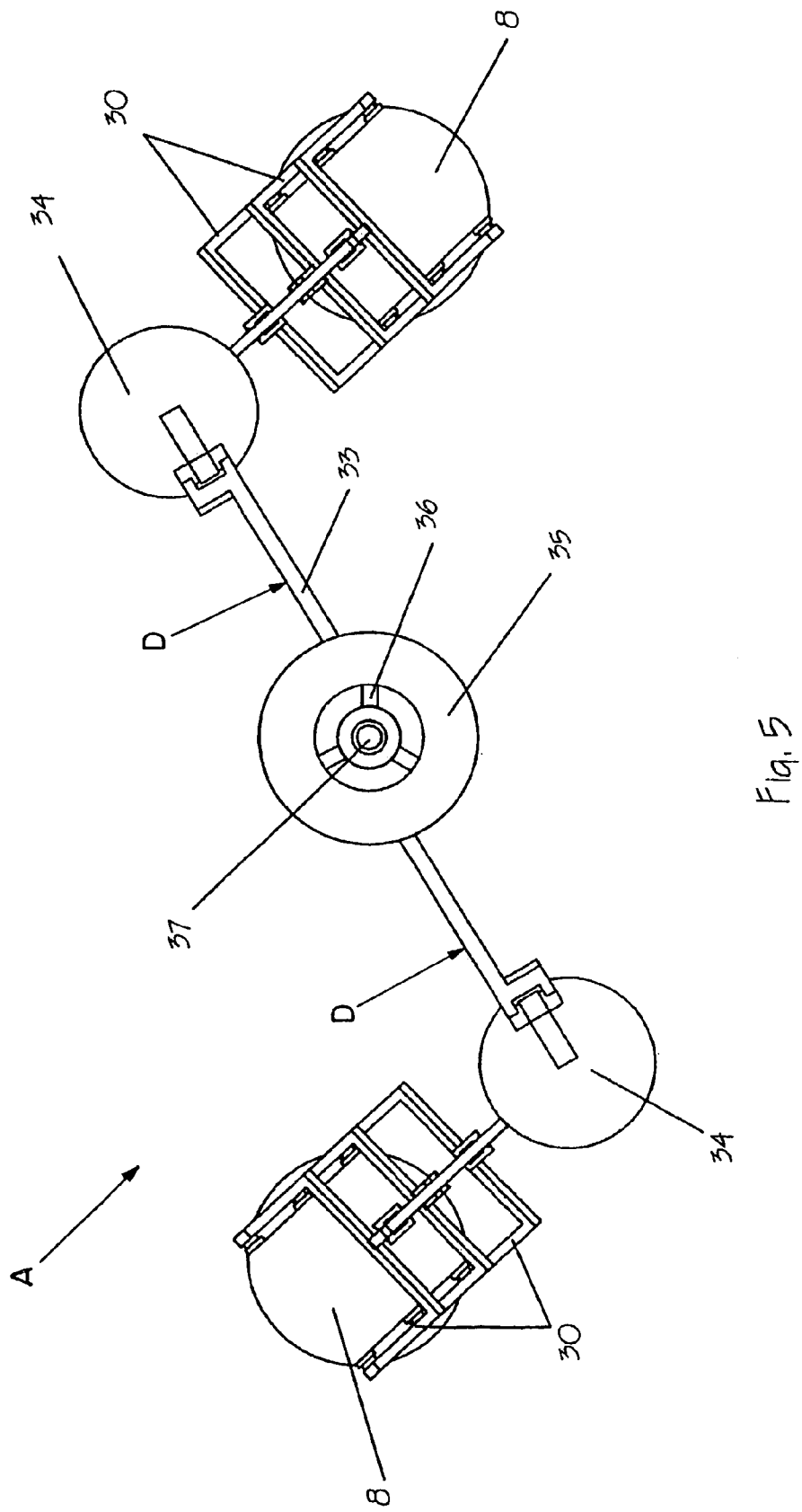
FIG. 5 is a top view of the embodiment of FIG. 1, showing the parallel mid-planes of the passive parallelogram linkages.

As can be seen in FIG. 5, a top view of the manipulating device A shows that the passive parallelogram linkages 33 are attached to the common moving platform 35 in a diametrically aligned fashion, thus characterizing this embodiment by parallel vertical mid-planes of the passive parallelogram linkages 33 of the two legs B.

Referring to FIG. 4, a layout of the transmission, with a sketch of a differential mechanism of an actuator unit C, will be described.

The rotating housing 8, enclosing the differential mechanism, rotates with respect to the base 1, where motors 28 and 29 are mounted. The pairs of motors 28 and 29 of both actuator units C can generally be installed at different levels. However, it is preferable to keep them at the same level in order to obtain a better load balance. In a preferred embodiment, the motors 28,29 are placed as shown in FIG. 4, which allows for all four motors of the device A to be fixed to the bases 1.

A driving torque from motor 28 is successively transmitted from a motor shaft 4 to a first gear 3 rigidly attached thereto, then to a second gear 10 meshed with gear 3, to a hollow shaft 11 rigidly attached to gear 10, and then to a bevel lower sun gear 20, rigidly attached to an opposite end of the hollow shaft 11. Similarly, a driving torque of motor 29 is successively transmitted from a motor shaft 21 to a first gear 22 rigidly attached thereto, then to a second gear 12 meshed with gear 22, to a central shaft 5 rigidly attached to gear 12, and then to a bevel upper sun gear 15 rigidly attached to an opposite end of the central shaft 5.

The torque from the bevel sun gears 15,20 is transmitted to bevel planet gears 17 and 17' which are orthogonally meshed with both sun gears 15,20 to form a differential system, the planet gears 17,17' being respectively fixed on first and second output shaft 18 and 19. The torque is then transmitted from each of the output shafts 18,19 to a respective one of the driving links 27 through one of the speed reducers 6,9. The two speed reducers 6,9 are of opposite hands, which allows for a balanced driving of the parallelogram linkage 30. This requires that one of the two speed reducers 6,9 include a speed reverser. Also, because of the differential system, a difference of rotation velocity between sun gears 15,20 creates a rotation of the axis of the planet gears 17,17' around the central shaft 5, which causes the rotating housing 8 to rotate with respect to the base 1.

In order to add structural stability to these transmissions, ends of the motor shafts 4,21 are supported in the support frame 2 by support bearings 13. The hollow shaft 11 of the lower sun gear 20 passes through a bore in the support frame 2, the assembly hollow shaft 11—sun gear 20 being held in place by thrust bearings 16 for additional structural stability. The central shaft 5 passes through the hollow shaft 11 and is supported therein by lower and upper intermediate bearings 23,25. The central shaft 5 is also supported in the base 1 by a lower central bearing 26 and in the rotating housing 8 by an upper central bearing 14.

The above described arrangement makes it possible to transmit motion to both sun gears 15 and 20 from the lower part of each differential mechanism, thereby avoiding interference of the housings 8 of the two actuator units C when the manipulating device A is in motion.

The differential mechanism formed by the two sun gears 15,20 and the two planet gears 17,17' is supported by: (a) the case of the rotating housing 8; (b) the support frame 2; and (c) planet supports 7. The planet supports 7 are fixed to the rotating housing 8 and restrain the relative displacement of the planet gears 17,17' to a rotation about their axis of symmetry.

Let $\omega_A$ and $\omega_B$ denote the input velocities of the motors 28 and 29, respectively, the output velocity of planet gears 17,17' around their axes being denoted by $\omega_1$. Moreover, the rotation of the axes of the planet gears 17,17' around the axis of the shaft 5 is denoted by $\omega_2$ which is the angular velocity of the housing 8 and constitute the pan motion of the actuator unit C.

The velocities $\omega_1$ and $\omega_2$ are known in the art to be related to those of the motors by $$\omega_1 = \frac{1}{2}(K_B\omega_B - K_A\omega_A)\frac{N_S}{N_P}$$

$$\omega_2 = \frac{1}{2}(K_A\omega_A + K_B\omega_B)$$

where $K_A$ is the reduction ratio of the gear train between motor 28 and the hollow shaft 11; $K_B$ is the reduction ratio of the gear train between motor 29 and the central shaft 5; $N_S$ is the number of teeth of the sun gears 15,20 and $N_P$ is the number of teeth of the planet gears 17,17'. In general, $K_A$ and $K_B$ need not be equal. However, it is preferable that $K_A=K_B$ in order to equally distribute the load between the two motors 28,29.

Furthermore, the rotation of planets 17 and 17' is transmitted to the driving links 27 via the speed reducers 6,9. The driving links 27 then move the active parallelogram linkage 30 of FIG. 1 via the coupler link 31. The speed reducers 6,9 provide a high reduction ratio $K_R$ between the outputs of the differential mechanism and the motion of the active parallelogram linkages 30. The speed reducers 6,9 also provide synchronization of the output rotations of the differential mechanism driving the parallelogram linkage 30. Moreover, the use of worm-gears as speed reducers 6,9 provides a self-locking capability to the manipulating device A, which is a desirable feature in the manipulation of heavy loads.

In operation, the driving links 27 therefore drive the active parallelogram linkage 30 located outside of the housing 8 with an angular velocity $\omega_1/K_R$, constituting the tilt motion of the actuator unit C. The pan motion of the actuator unit C, as stated above, is denoted by $\omega_2$ and constitutes the rotation of the axes of the planet gears 17,17' around the axis of the shaft 5, which causes the housing 8, and the active parallelogram linkage 30 attached thereto, to rotate. The active parallelogram linkage 30 transfers this combined pan-tilt motion to the base 32 of the passive unit D linked therewith through pin joints. The structure of the parallelogram linkage 30 ensures that the base 32 of the corresponding passive unit D remains parallel to the base 1. The movement of the base 32 causes the pan motion of the passive rotating housing 34 and the tilt motion of the passive parallelogram linkage 33 which is attached to the common moving platform 35 with pin joints. Hence, the collaboration of the legs B causes the common platform 35 to remain parallel to the bases 1 by virtue of the passive parallelogram linkages 33 of all legs.

Figure 18:
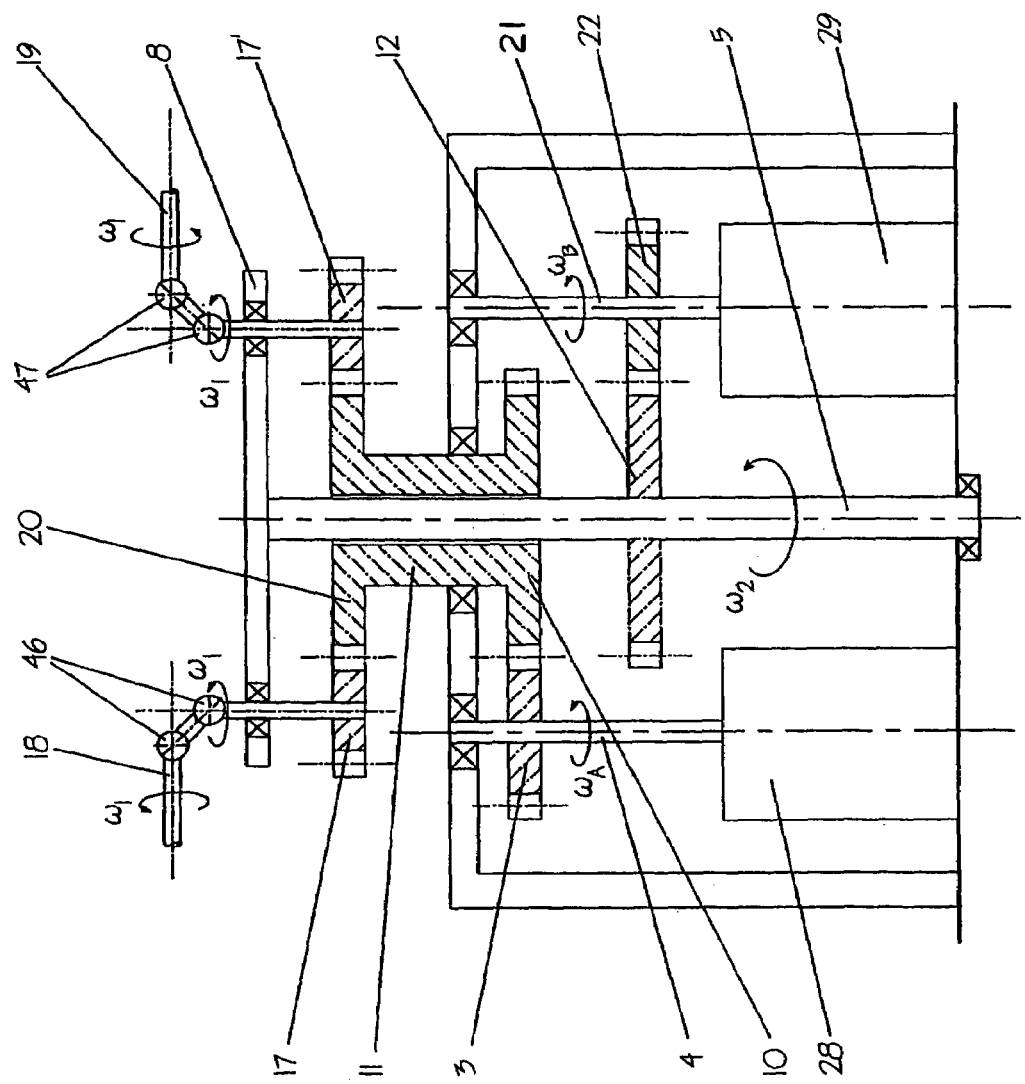
FIG. 18 is a cross-section view of an alternative to the differential mechanism of FIG. 4, which is composed of helicoidal gears producing the pan-tilt motion of each of the two legs and can be used with any of the foregoing embodiments.

Now referring to FIG. 18, a layout of an alternative transmission to the one presented in FIG. 4 will now be described, where like elements are identified by like reference characters. The two motors 28,29 are fixed to the base 1 in a manner similar to that of the precedent embodiment, but the bevel gears 15,17,17',20 forming the differential mechanism described in FIG. 4 are replaced by an epicyclic train of helicoidal gears 17,17',20 combined with universal joints 46,47 that enable the transmission of force and motion from a vertical to a horizontal shaft.

In this embodiment, a driving torque from motor 28 is successively transmitted from a motor shaft 4 to a first gear 3 rigidly attached thereto, then to a second gear 10 meshed with gear 3, to a hollow shaft 11 rigidly attached to gear 10, to a sun gear 20 rigidly attached to the hollow shaft 11, and then to planet gears 17,17' meshed with the sun gear 20. The planet gears 17, 17', in turn, transmit the driving torque to output shafts 18,19 through universal joints 46,47. Similarly, a driving torque from motor 29 is successively transmitted from a motor shaft 21 to a first gear 22 rigidly attached thereto, then to a second gear 12 meshed with gear 22, to a central shaft 5 rigidly attached to gear 12, and then to the planet carrier 8 rigidly attached to the central shaft 5 and playing the role of the housing 8 shown in FIG. 4.

Let $\omega_A$ and $\omega_B$ denote the input angular velocities of motors 28 and 29, respectively, the common output velocity of the planet gears 17,17' being given by $$\omega_{17} = \frac{N_3 \times N_{20}}{N_{10} \times N_{17}} \omega_A - \left(1 + \frac{N_{20}}{N_{17}}\right) \frac{N_{22}}{N_{12}} \omega_B$$

while the angular velocity $\omega_2$ of the pan motion, identical to the rotation of the planet-carrier 8, is $$\omega_2 = -\frac{N_{22}}{N_{12}} \omega_B$$

The angular velocity $\omega_1$ producing the tilt motion is the horizontal component $\omega_{17} - \omega_2$ of the common angular velocity of output shafts 18,19, that is, $$\omega_1 = \omega_{17} - \omega_2 = \frac{N_3 \times N_{20}}{N_{10} \times N_{17}} \omega_A - \frac{N_{20} \times N_{22}}{N_{12} \times N_{17}} \omega_B$$

If, in particular, $N_{22}/N_{12} = N_3/N_{10}$, then $$\omega_1 = \frac{N_3 \times N_{20}}{N_{10} \times N_{17}} (\omega_A - \omega_B)$$

A number of alternative embodiments of the manipulating device A are possible, including, but not limited to, the embodiments described herein below, with like elements being identified by like reference characters.

Figure 6:
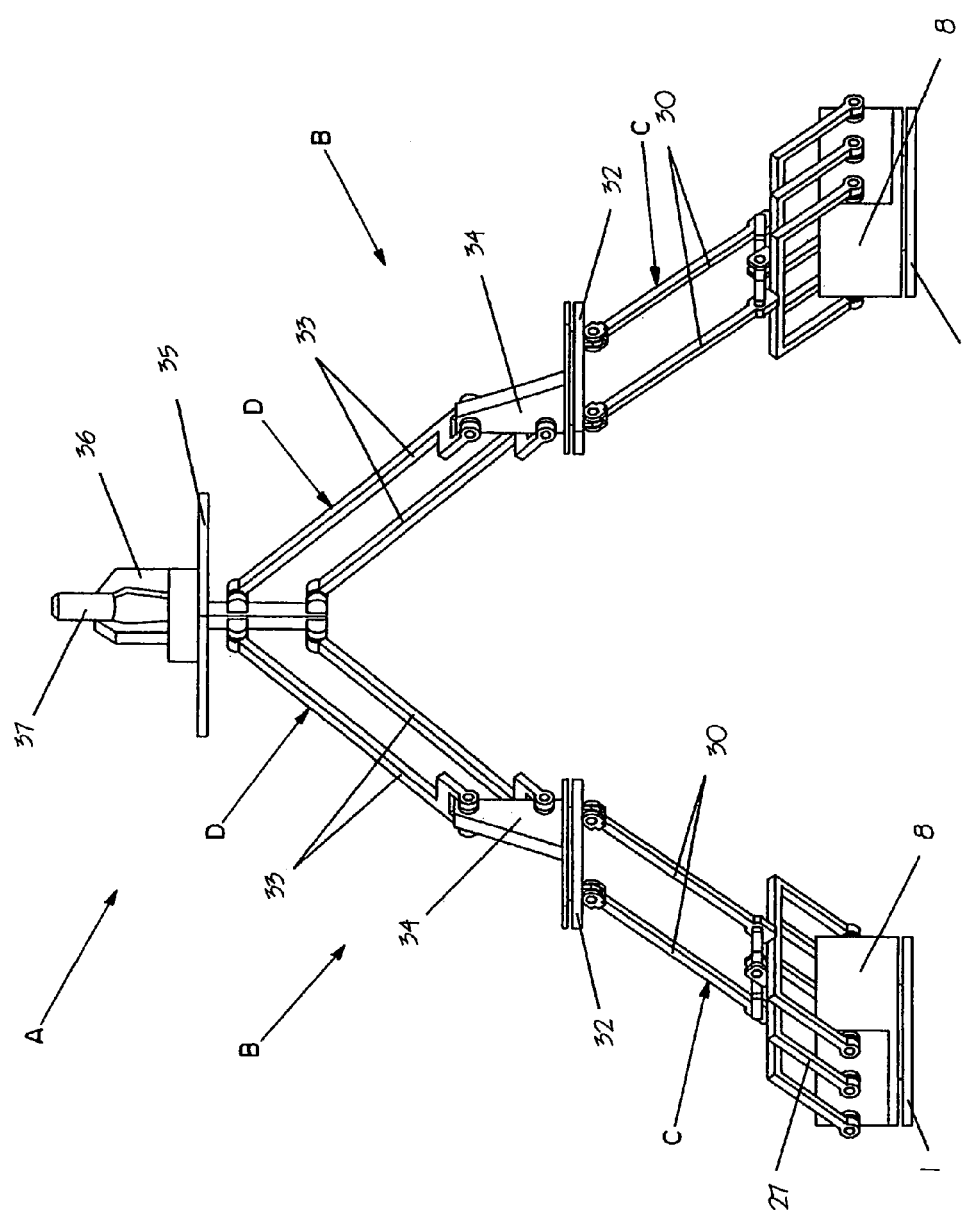
FIG. 6 is a perspective view of a second embodiment in accordance with the present invention, which is characterized by orthogonal mid-planes of the passive parallelogram linkages.
Figure 7:
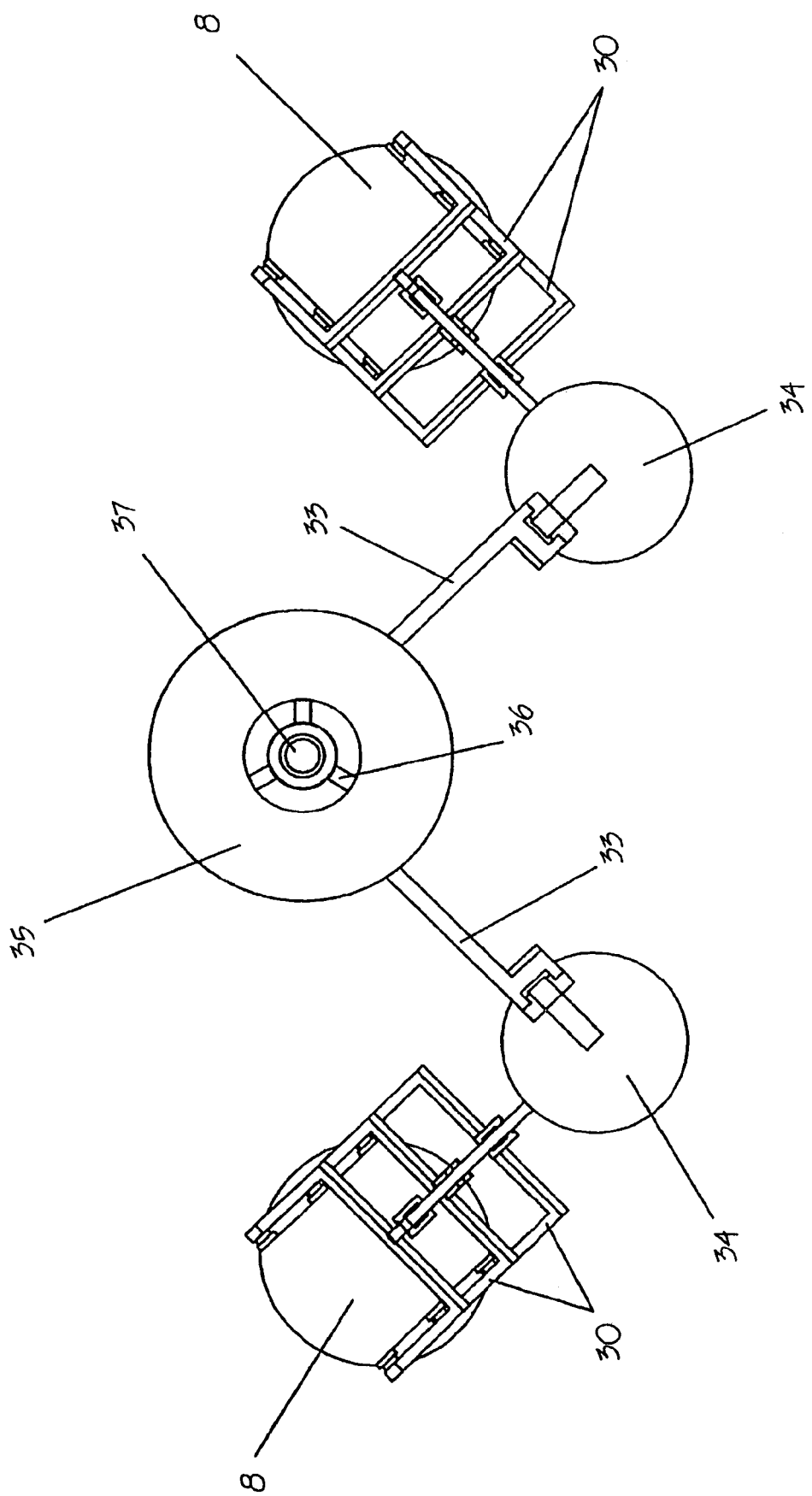
FIG. 7 is a top view of the embodiment of FIG. 6.

Referring to FIGS. 6–7, a second embodiment according to the present invention is shown. This embodiment, like the first embodiment described, uses horizontal positioning of the base 32 of each active parallelograms 30. However, the attachment of the passive parallelogram linkages 33 to the common moving platform 35 is such that the mid-planes of the passive parallelogram linkages 33 are orthogonal, as can be best seen in the orientation of the passive units D illustrated in FIG. 7.

Figure 10:
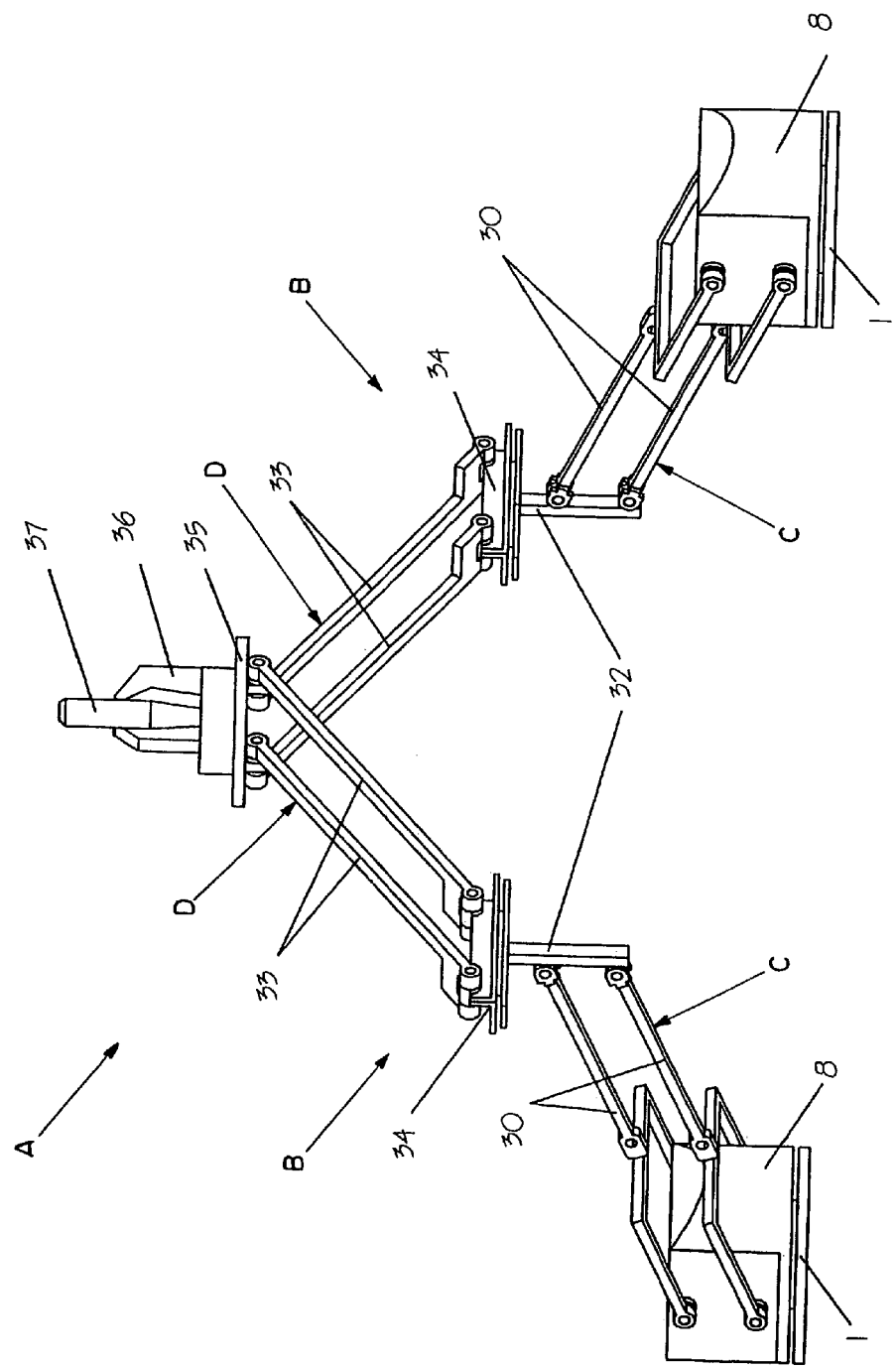
FIG. 10 is a perspective view of a third embodiment in accordance with the present invention, which is characterized by a vertical array of joint centers of each active parallelogram linkage, thereby reducing the space requirements in the horizontal direction, and by parallel mid-planes of all passive parallelogram linkages.
Figure 11:
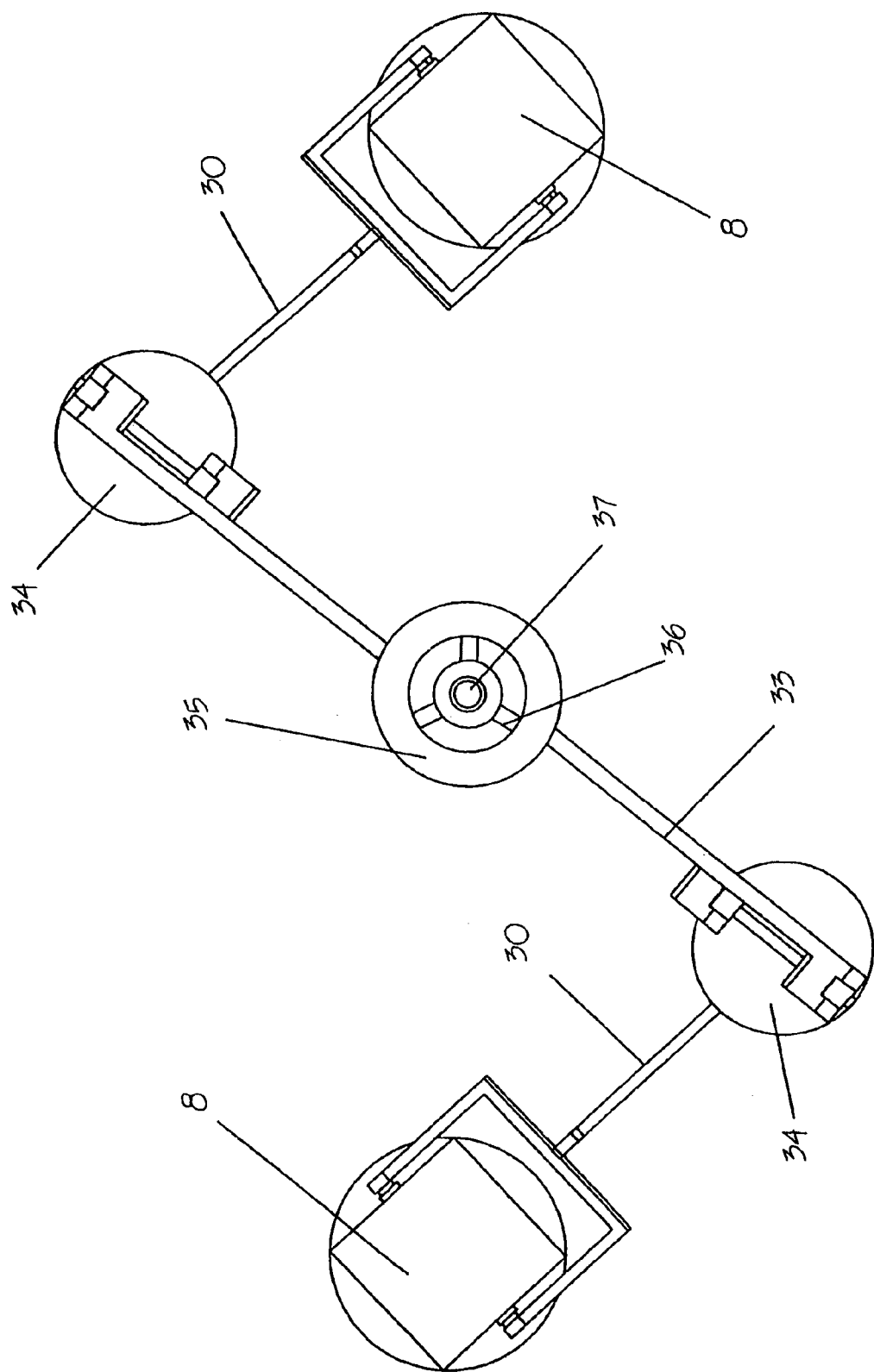
FIG. 11 is a top view of the embodiment of FIG. 10.

Referring to FIGS. 10–11, a third embodiment in accordance with the present invention is shown, where the attachment points of each of the active parallelogram linkages 30 with both the housing 8 and the base 32 of the passive unit D are vertically aligned. This has the consequence of having vertically aligned pin joints between each of the bases 32 and the respective active parallelogram linkage 30. This geometry presents the advantage of eliminating the driving links 27 while still keeping the symmetry of the housing 8 of each actuator unit C. Nevertheless, a reversing output gear train for one side of the active parallelogram linkages 30 is still required in this embodiment. Similarly to the first embodiment, this embodiment is characterized by parallel mid-planes of the passive parallelograms 33, as can be best seen in FIG. 11.

Figure 12:
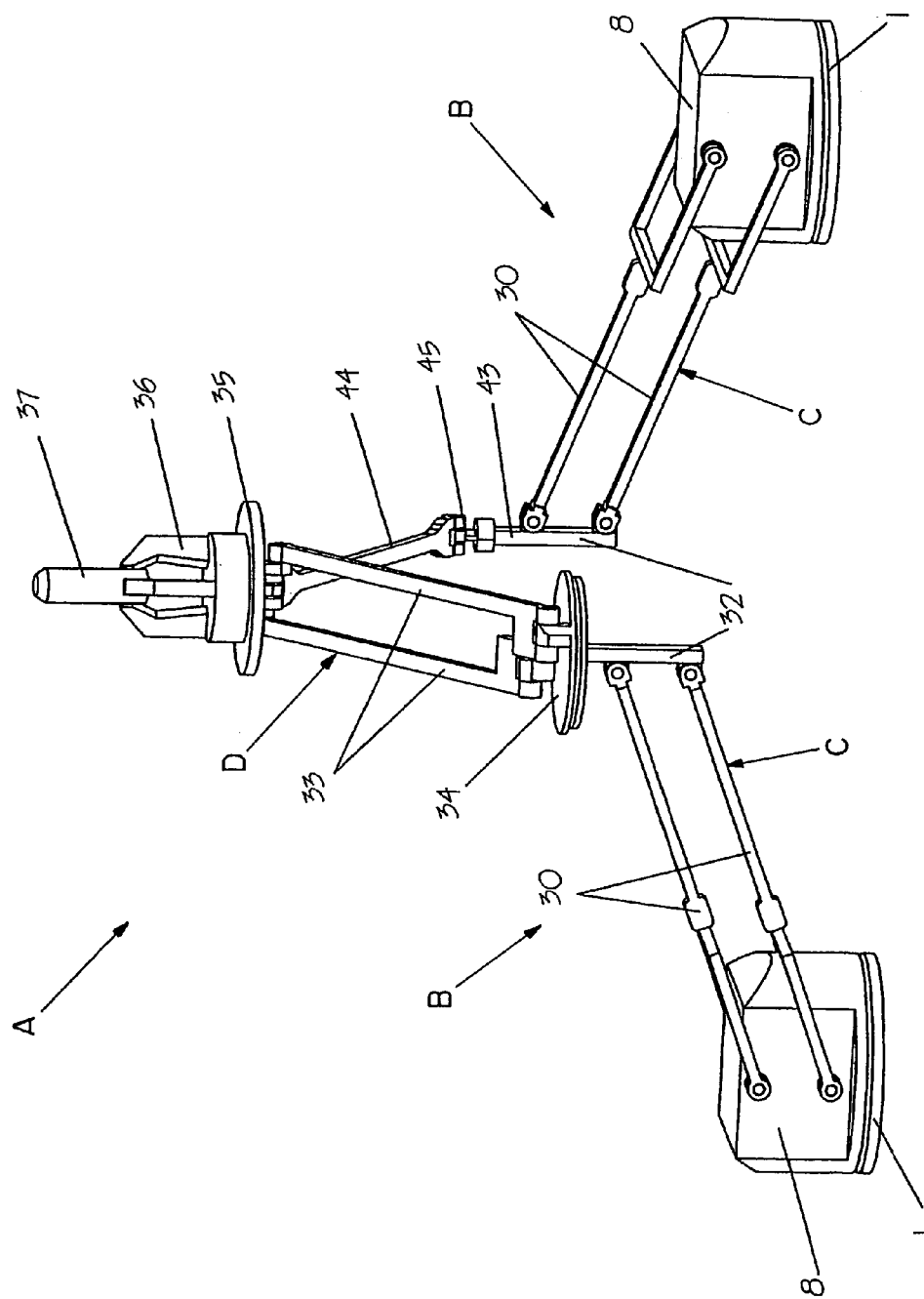
FIG. 12 is a perspective view of a fourth embodiment in accordance with the present invention, which is characterized by the replacement of one of the two passive parallelogram linkages by a single joint.
Figure 13:
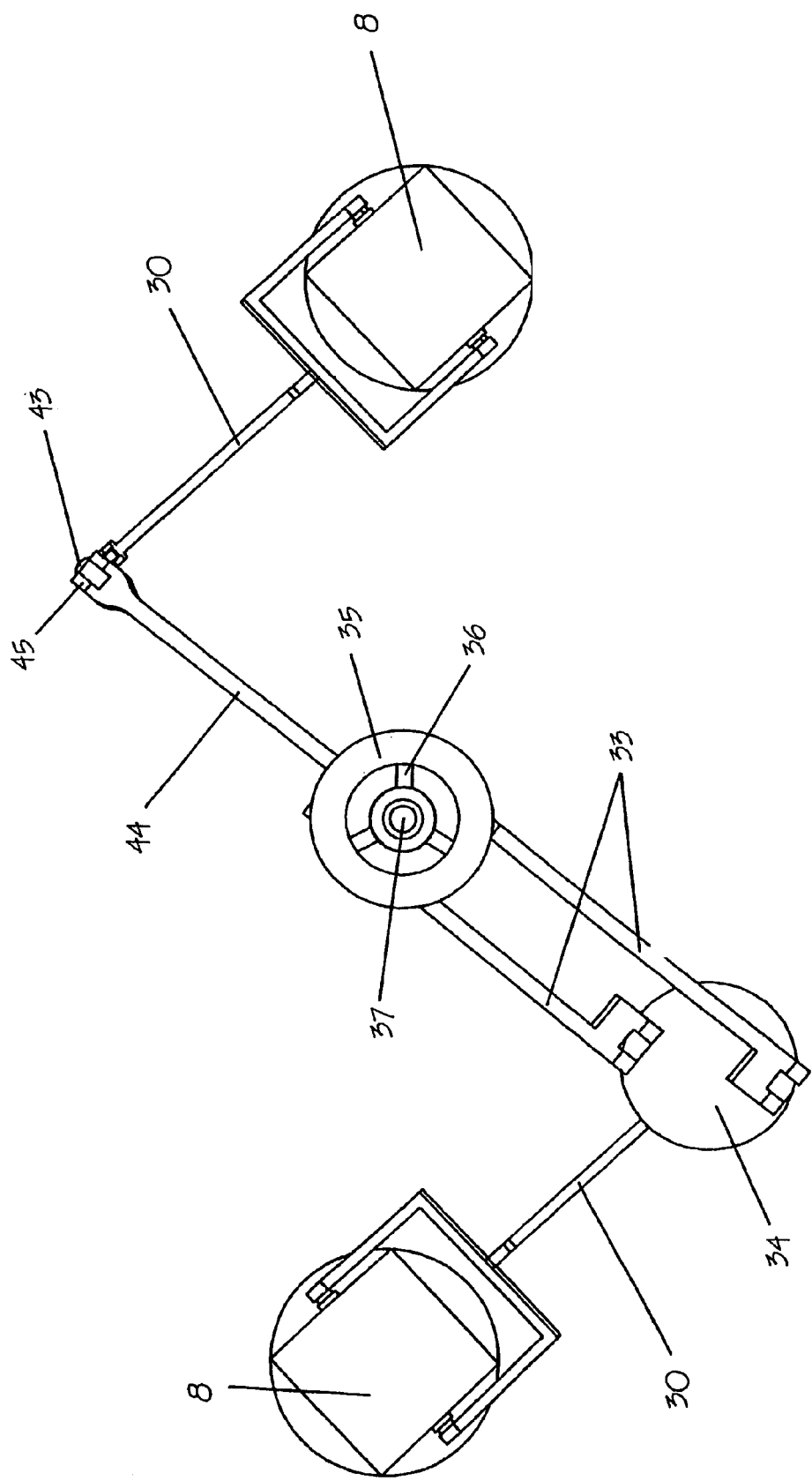
FIG. 13 is a top view of the embodiment of FIG. 12.

Referring to FIGS. 12–13, a fourth embodiment in accordance with the present invention is shown, also using vertical alignment of the attachment points of each of the active parallelogram linkages 30 with the respective housing 8 and base 32. However, in one of the passive units D, the passive rotating housing 34 is replaced by a universal joint 45 and a vertical link 43 and the passive parallelogram linkage 33 is replaced by a passive single link 44 connected to the universal joint 45, producing a kinematic equivalent to the passive unit D of the previous embodiments. In this embodiment, the mid-planes of the passive parallelogram linkage 33 and the passive single link 44 are also parallel, as can be best seen in FIG. 13.

Figure 14:
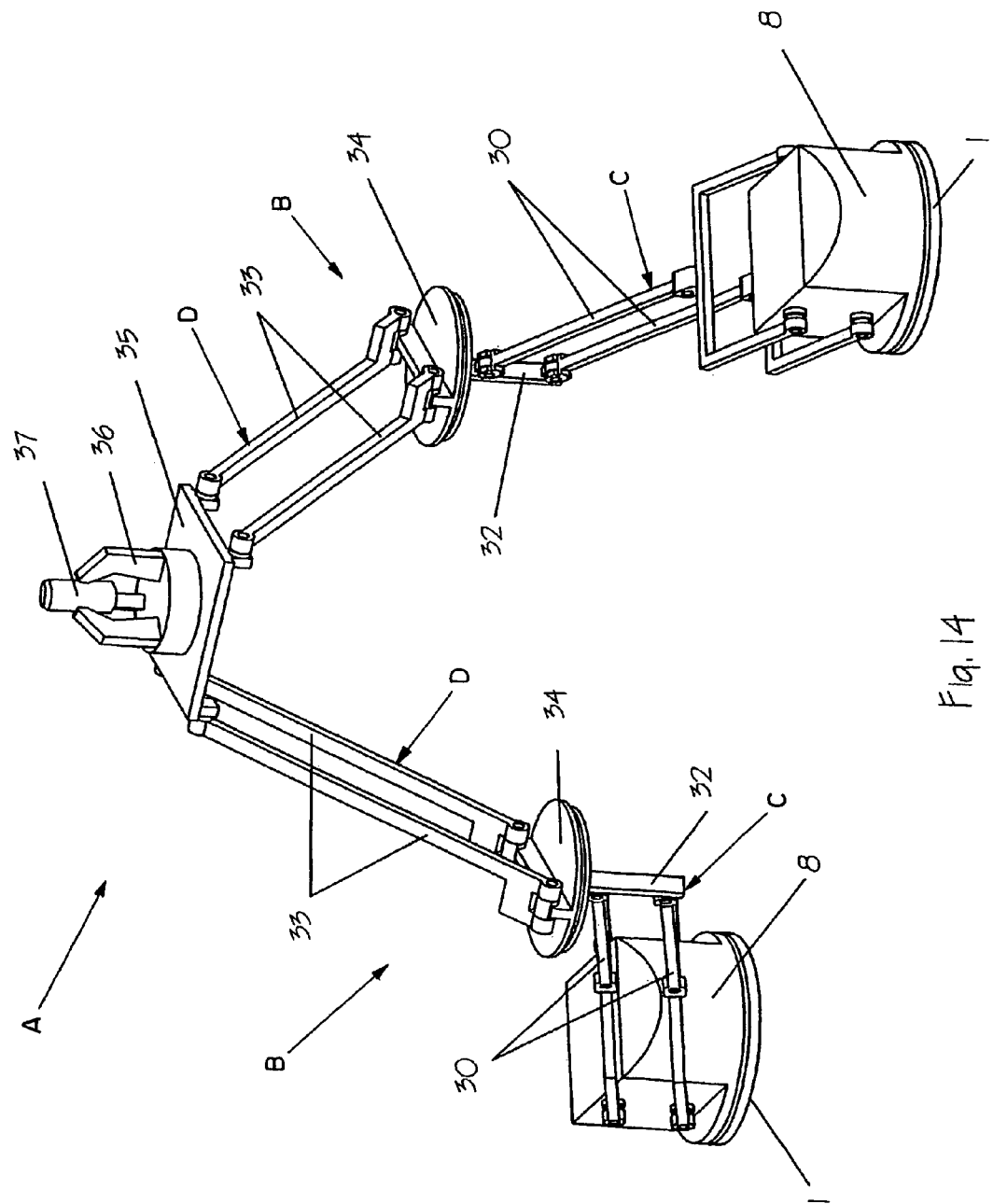
FIG. 14 is a perspective view of a fifth embodiment in accordance with the present invention, which is characterized by a vertical array of joint centers of each active parallelogram linkage, thereby reducing the space requirements in the horizontal direction, and by parallel mid-planes of all passive parallelogram linkages.
Figure 15:
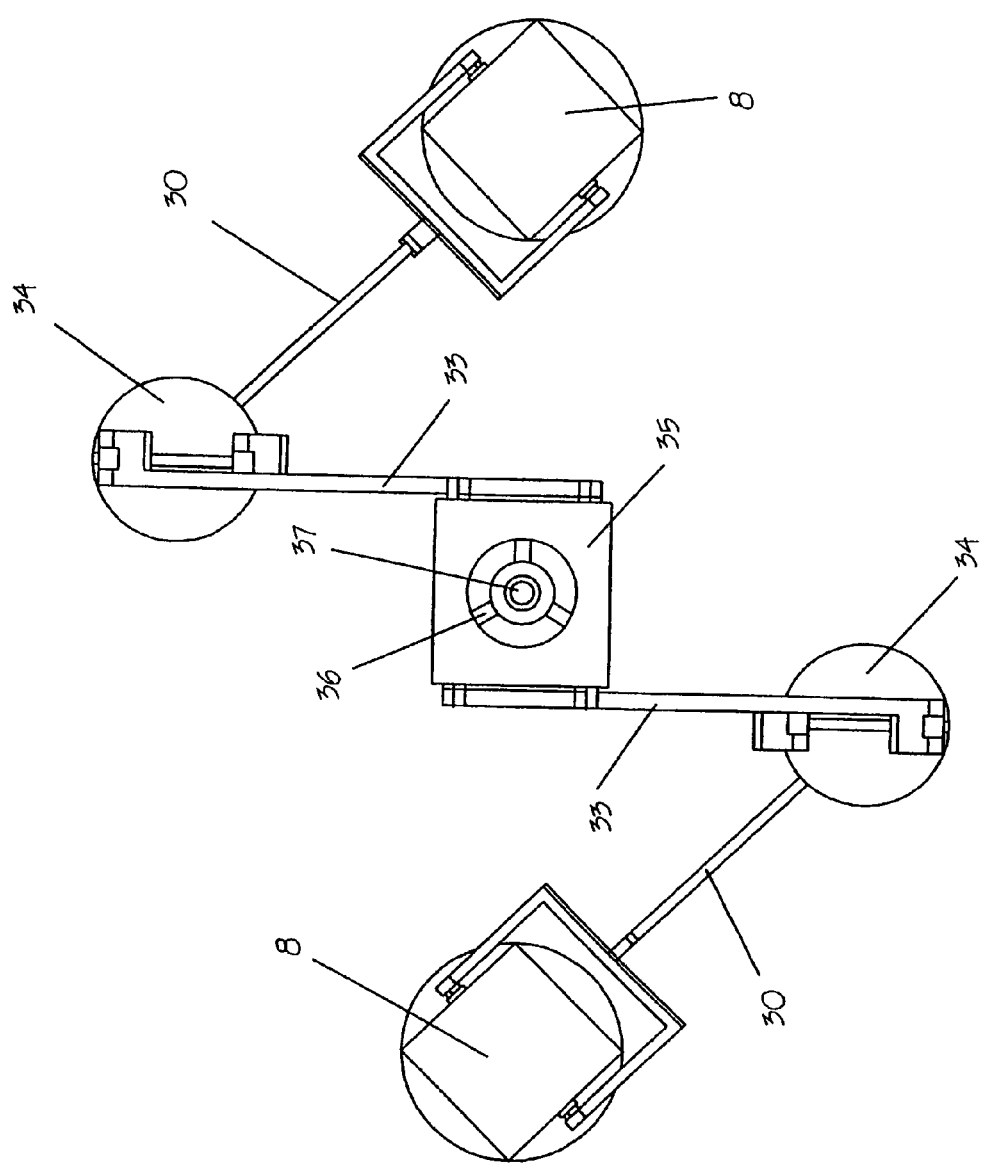
FIG. 15 is a top view of the embodiment of FIG. 14.

Referring to FIGS. 14–15, a fifth embodiment in accordance with the present invention is shown, also using vertical alignment of the attachment points of each of the active parallelogram linkages 30 with the respective housing 8 and base 32. As can be best seen in FIG. 15, this embodiment is characterized by mid-planes of the passive parallelogram linkages 33 that are parallel but farther apart than in the previous embodiments having parallel mid-planes. This embodiment can provide higher mobility and a larger workspace by virtue of a larger spacing between mid-planes, which reduces a likelihood of interference between the linkages of the two legs.

Figure 19:
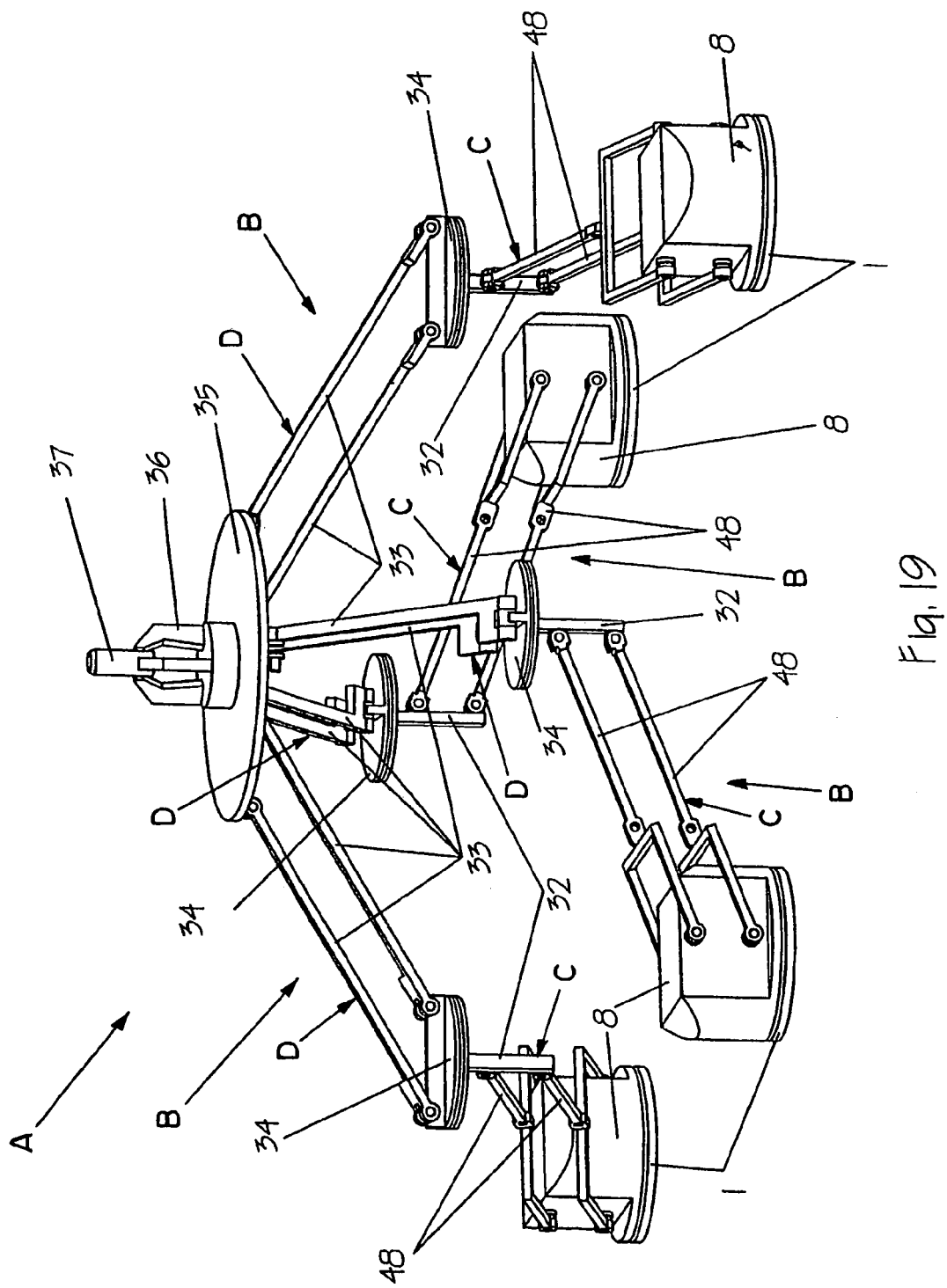
FIG. 19 is a perspective view of a sixth embodiment according to the present invention, where four identical legs are used to manipulate the moving end-effector, each leg being driven by a single motor.
Figure 20:
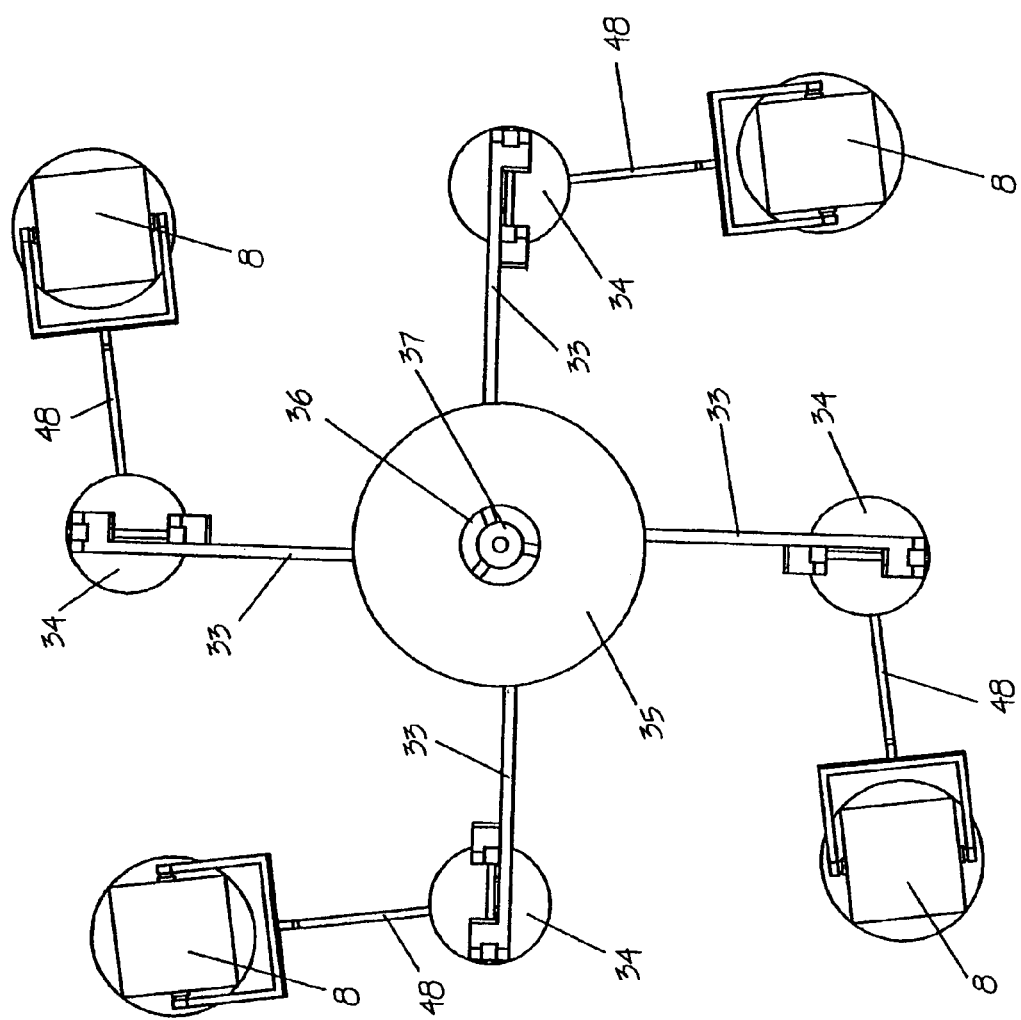
FIG. 20 is a top view of the embodiment of FIG. 19.

Referring to FIGS. 19–20, a sixth embodiment in accordance with the present invention has four legs B instead of two. This embodiment can also accommodate the variety of link layouts presented in the first five embodiments. Other variations include three-legged arrays, with a combination of one- and two-motor driving units.

Figure 23:
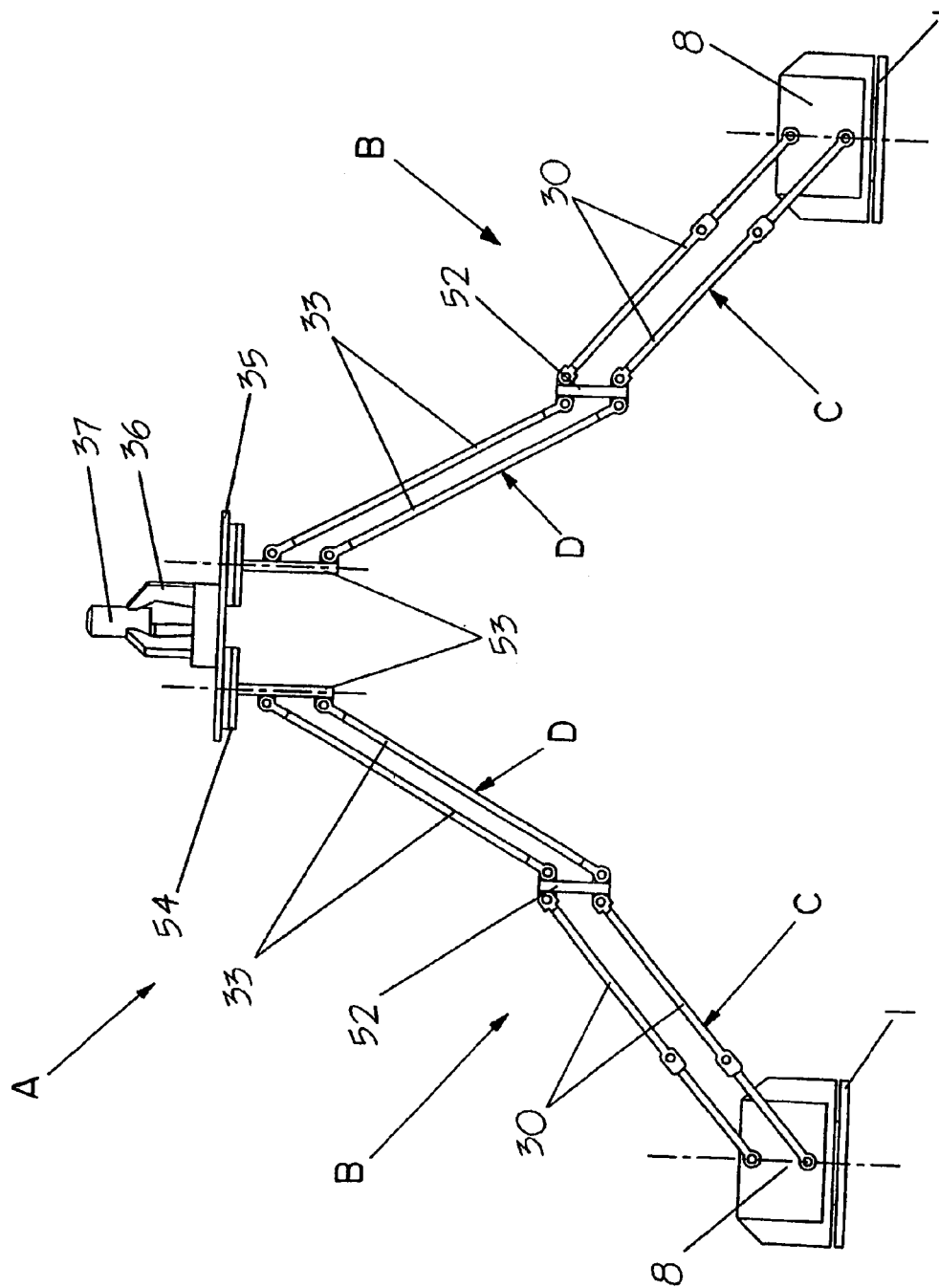
FIG. 23 is a side view of a seventh embodiment according to the present invention, which is characterized by a transfer of a pin joint of the passive parallelogram linkage to an attachment point of each leg with the end-effector, thus allowing the end-effector to sweep an angle of rotation much greater than with any of the foregoing embodiments.
Figure 24:
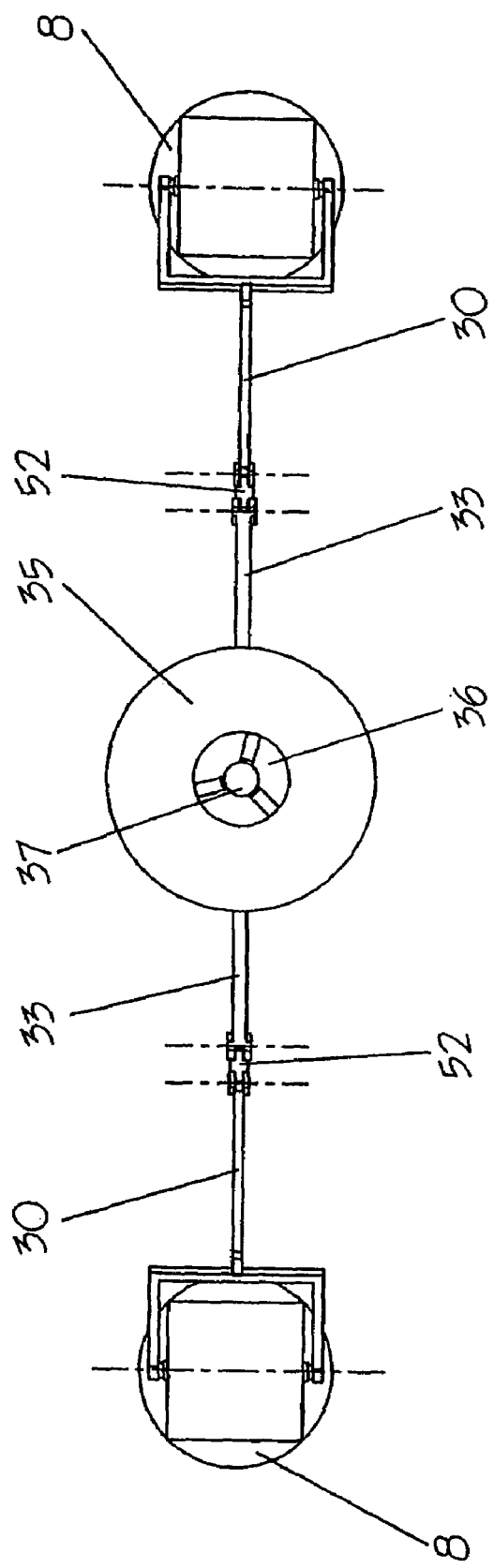
FIG. 24 is a top view of the embodiment of FIG. 23.

Referring to FIGS. 23–24, a seventh embodiment in accordance with the present invention is characterized by the transfer of a second pin joint of the passive unit D to the attachment point of each leg B with the moving platform 35 in a pin-joint holder 53, thus enhancing the rotation capabilities of the device. The pan motion of the passive units D is provided by pin-joints 54 under the moving platform 35 and attached to the pin-joint holder 53. The actuator unit C and passive unit D are linked through a vertical intermediate coupler 52. Because of a smaller distance between pan axes of the passive units D, as compared with a corresponding distance in the previous embodiments, similar pan motions provided by the motors will produce larger angular displacements of the moving platform 35. The moving platform 35 in this embodiment can thus sweep a much greater angle of rotation, with smaller space needed for the pan motion of the units C,D, than with any of the first six embodiments described above. This transfer of the second pin joint can be applied to any other embodiment in order to enhance the rotation capabilities thereof.

Using the intermediate driving link 27 of FIG. 2 is one way to drive the active parallelogram linkages 30. Other types of transmissions can also be used, such as gear trains, belt pulleys, rack-and-pinions, etc. Examples of alternative transmissions systems are herein presented.

Figure 8:
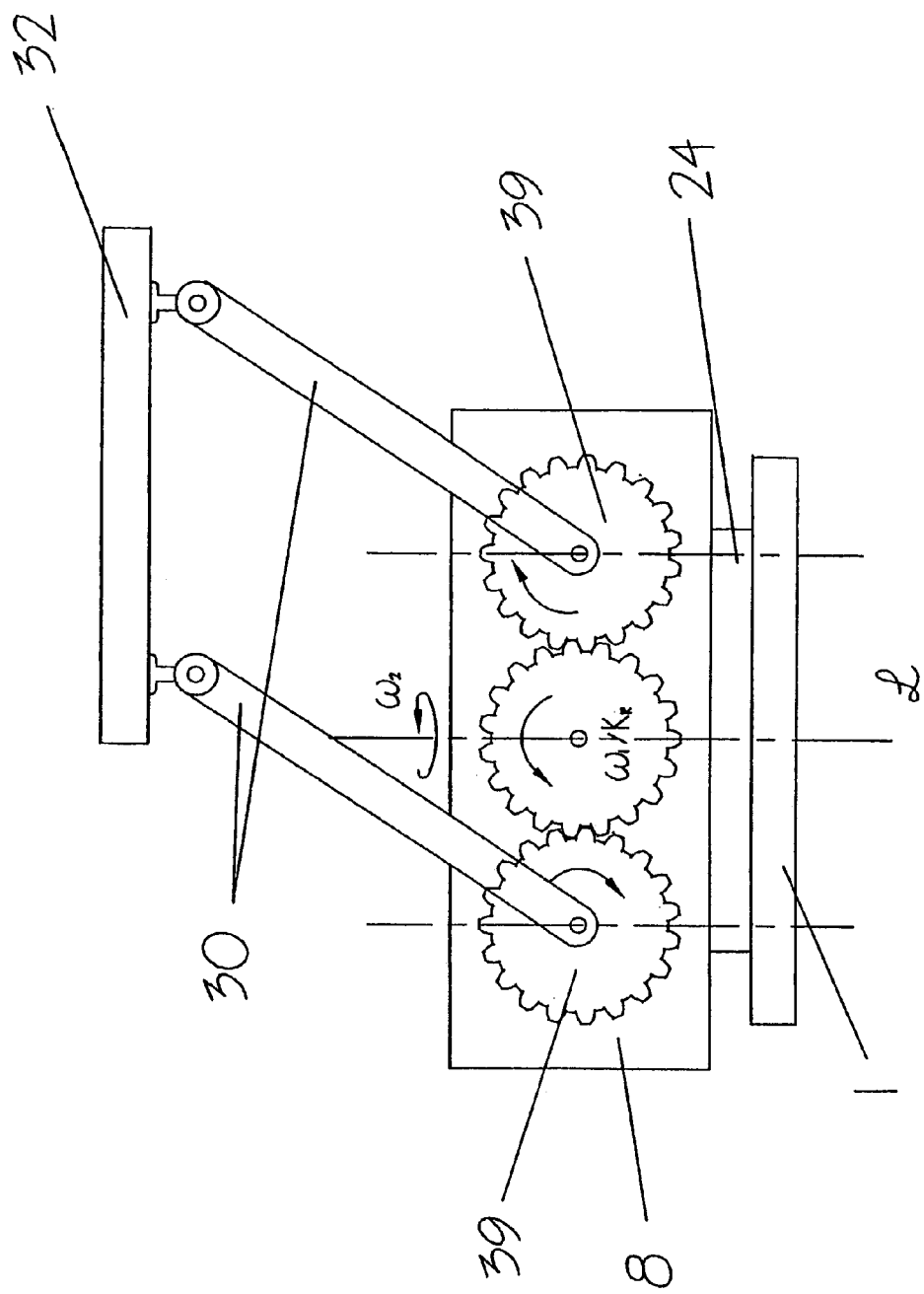
FIG. 8 is a side view of an alternative transmission in accordance with the present invention, providing a pan-tilt motion to each active parallelogram linkage using gear trains instead of parallel driving links.
Figure 9:
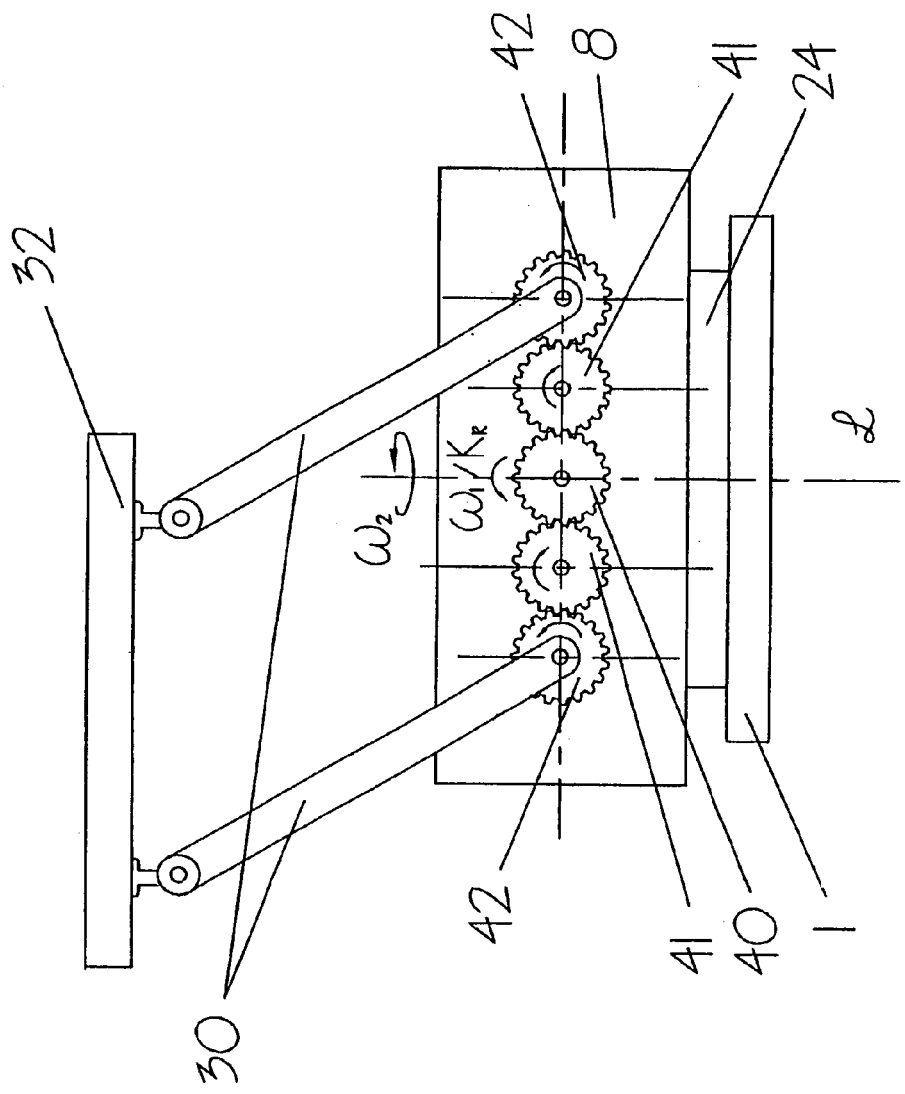
FIG. 9 is the opposite side view of the driving system of FIG. 8, where an intermediate gear has been added between the driving gear and each driven gear with the purpose of preserving the direction of rotation of the driving gear.

Referring to FIGS. 8–9, an alternative transmission in accordance with the present invention provide a pan-tilt motion to each active parallelogram linkage 30. The driving link 27 and coupler link 31 used in the transmission of the first embodiment (see FIGS. 2–3) are replaced by gear trains. It will be appreciated that, similarly to the transmission described in the first embodiment, one of the horizontal output rotations of the differential mechanism of an actuator unit C has to be reversed. One side of the output torque is therefore transferred from the differential mechanism to the active parallelogram linkage 30 through a reverse gear train as shown in FIG. 8 and the other through a direct gear train as shown in FIG. 9. The reverse gear train of FIG. 8 is composed of one output gear 38 meshed with two following gears 39. The direct gear train of FIG. 9 is composed of one output gear 40 meshed with two intermediate gears 40 which are each meshed with a following gear 42. The output gears 38,40 of both gear trains transmit the output torque from the differential mechanism, and the following gears 39,42 directly drive the active parallelogram linkage 30.

Figure 21:
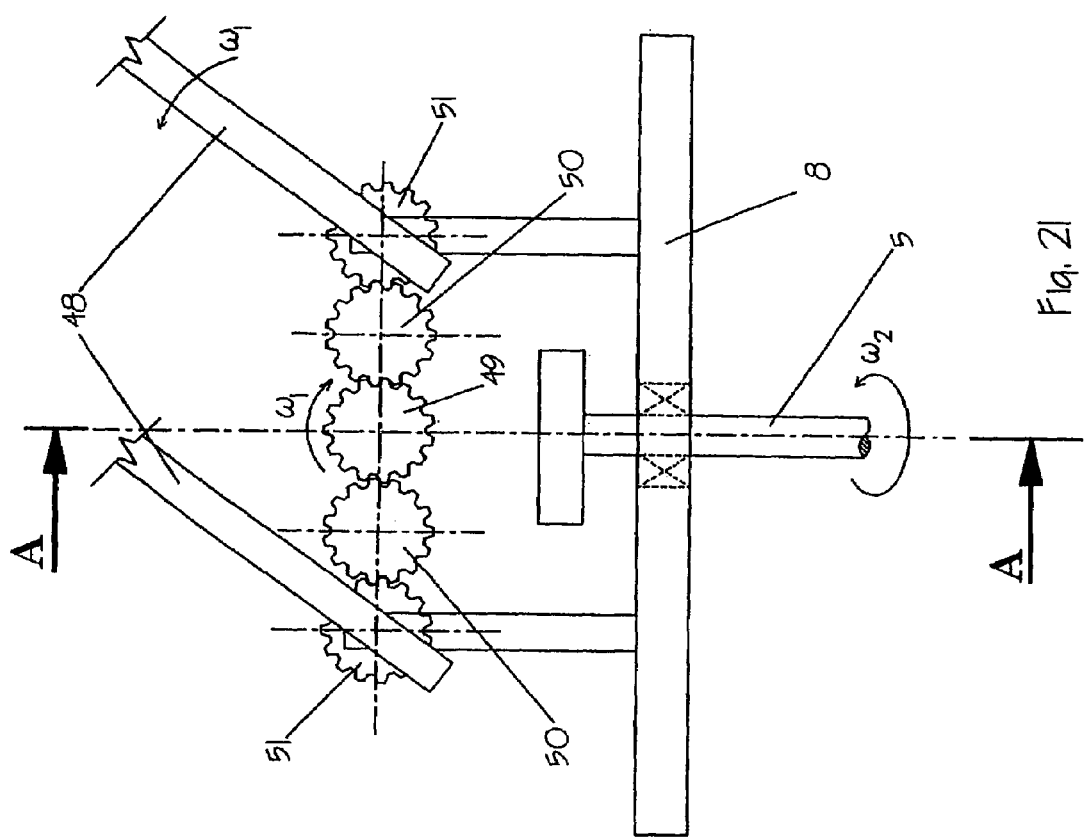
FIG. 21 is a side view of a train of helicoidal gears used to drive each leg of the embodiment of FIG. 19.
Figure 22:
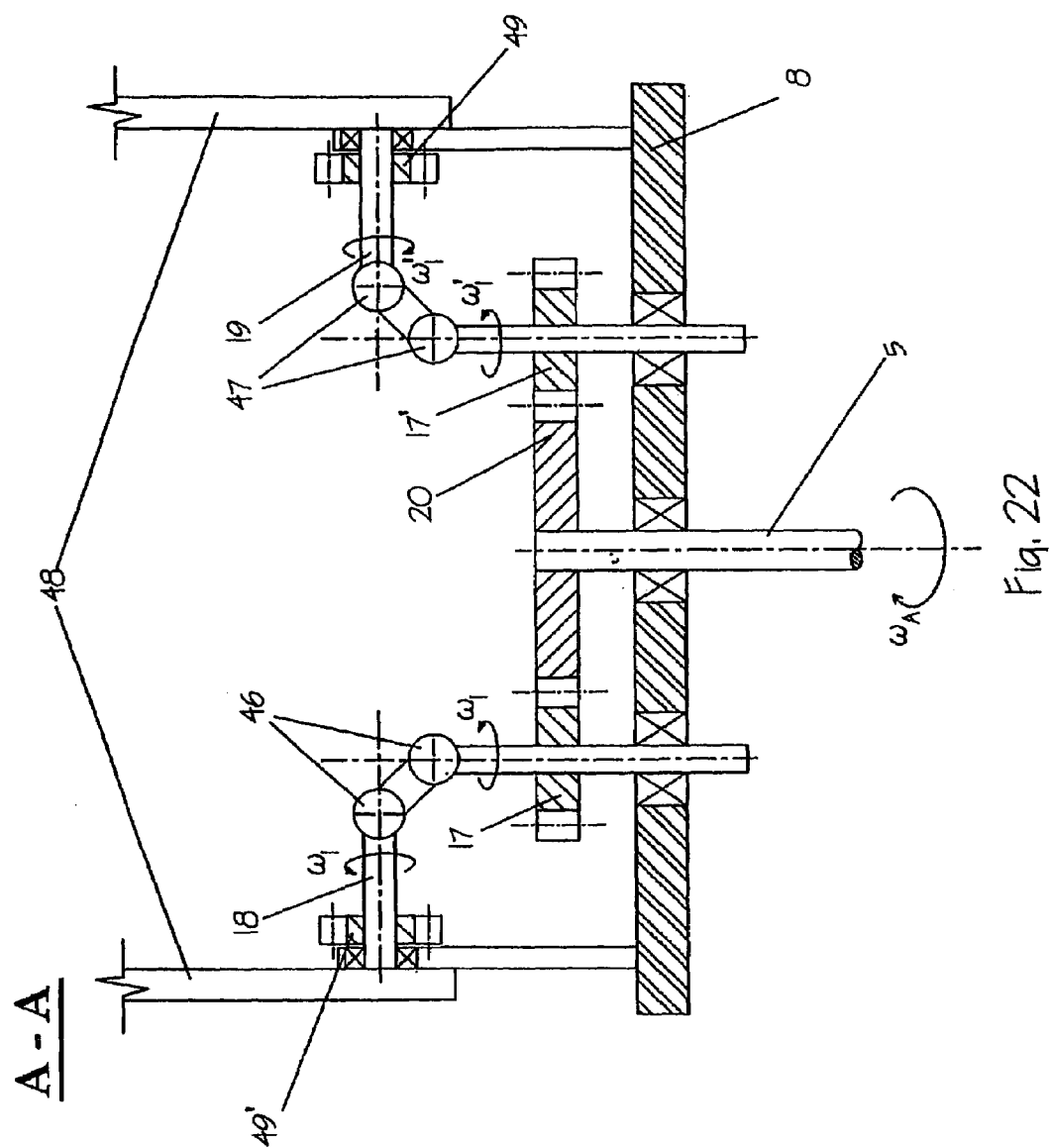
FIG. 22 is a front cross-section taken long line A—A of the gear train of FIG. 21.

Referring to FIG. 22, an alternative transmission for the case where each leg B is driven by a single motor is shown. A driving torque from the motor (not shown) is successively transmitted from a central shaft 5 to a sun gear 20 rigidly attached thereto, then to a pair of planet gears 17,17' meshed with sun gear 20, and to a pair of output shaft 18,19, each driven by one of the planet gears 17,17' via a pair of universal joints 46,47 to transfer the torque from a vertical to an horizontal direction. Referring to FIG. 21, the torque is then transferred from each output shaft 18,19 to a corresponding output gear 49,49'. Each output gear 49,49' is part of a train of helicoidal gears. Output gear 49, as shown in FIG. 21, is meshed with a pair of intermediate gears 50, each in turn being meshed with a following gear 51, and each following gear 51 being rigidly attached to an active linkage 48 playing the role of the active parallelogram linkage 30 of the previous embodiments. Although not shown, gear 49' is meshed directly with a pair of following gears 51, in a manner similar to that of FIG. 8 where the output gear 38 is directly meshed with the gears 39. This allows to transmit angular velocities of identical directions to the linkages 48 of both sides of the transmission.

Figure 16:
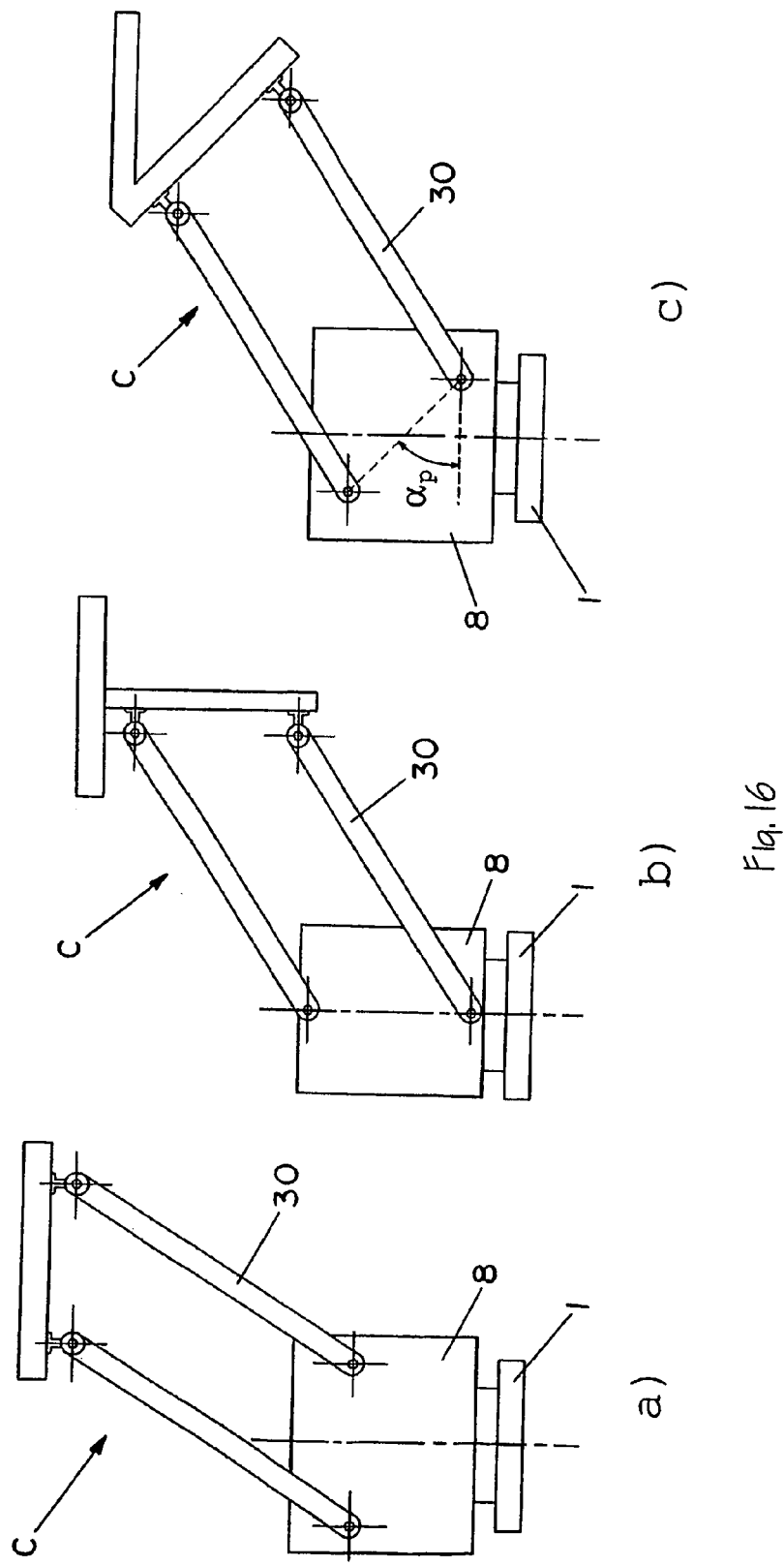
FIGS. 16a, 16b and 16c are side views of possible layouts of the active parallelogram linkage with joint axes thereof lying in: a) a horizontal plane; b) a vertical plane; c) a plane inclined with respect to the horizontal.
Figure 17:
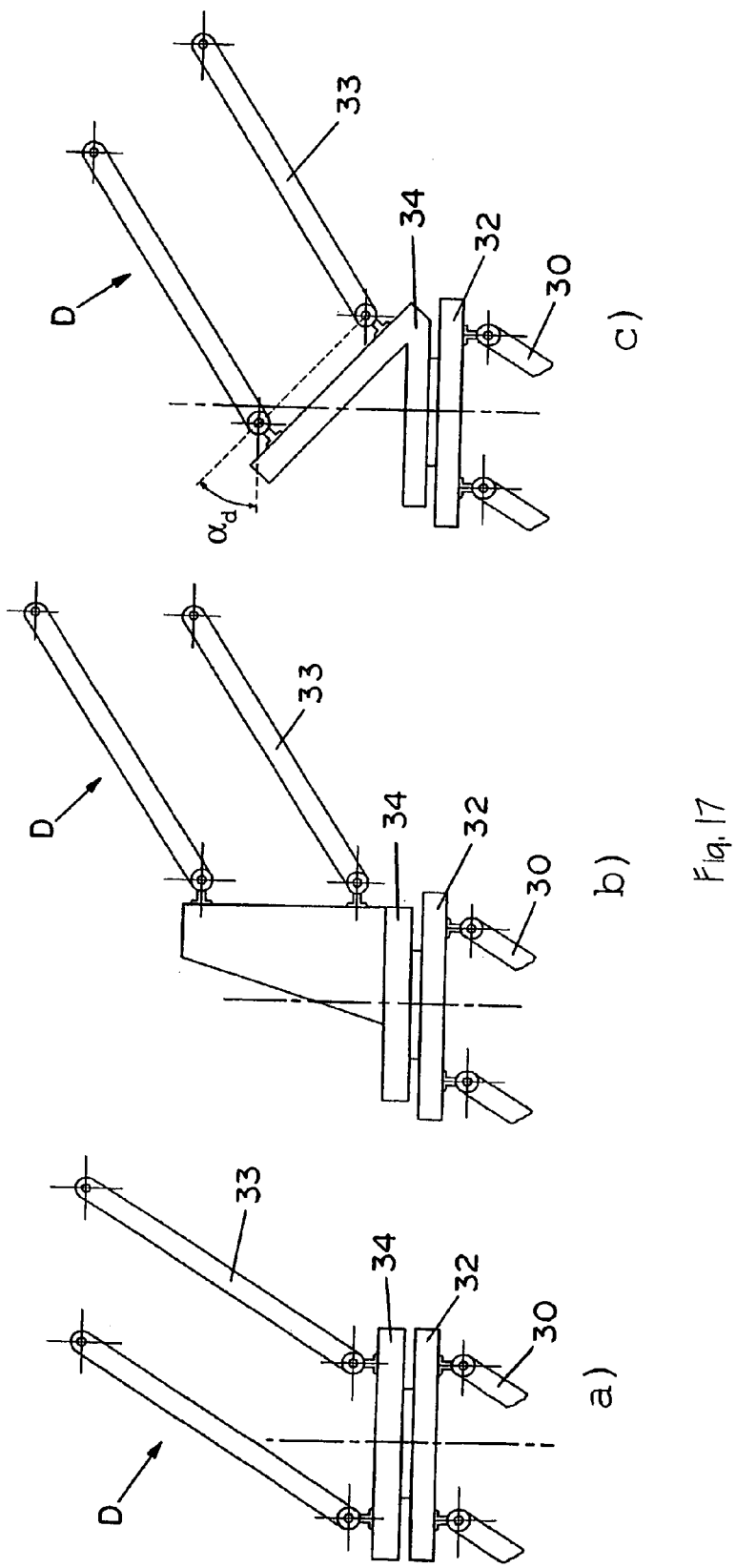
FIGS. 17a, 17b and 17c are side views of possible layouts of the passive parallelogram linkage with joint axes thereof lying in: a) a horizontal plane; b) a vertical plane; c) a plane inclined with respect to the horizontal.

The present invention as described herein offers an extraordinary functional flexibility in its layout, with a large number of other possible embodiments depending on the tasks envisioned. Referring to FIGS. 16a–16b–16c, the active parallelogram linkage 30 of an actuator unit C can be set on the housing 8 with joint axes lying in: a) a horizontal plane; b) a vertical plane; c) an inclined plane making an angle $\alpha_p$ with the horizontal. Referring to FIGS. 17a–17b–17c, the passive parallelogram linkage 33 of a passive unit D can similarly be set on the housing 34 with joint axes lying in: a) a horizontal plane; b) a vertical plane; c) a plane making an angle $\alpha_d$ with the horizontal. In the manipulating device A all four parallelogram linkages 30,33 may have their own independent layout, thus allowing for $n^k=3^4=81$ different embodiments, this number corresponding to that of permutations of distinct objects (3 arrangements of joint axes) and possible orderings (4 parallelogram linkages). Taking into account that the angles $\alpha_p$ and $\alpha_d$ may take any value in the range from 0° to 90°, the number of possible embodiments of the Schönflies-motion generator becomes almost unlimited. This characteristic provides a functional flexibility superior to the known prior art devices.

Another significant advantage of the present invention is that most of the wiring (control and power supply cables, sensor wires, etc.) ends on the base 1 in the area of installation of the motors 28,29, and need not be attached to the legs B, thus providing for a light structure.

Figure 25:
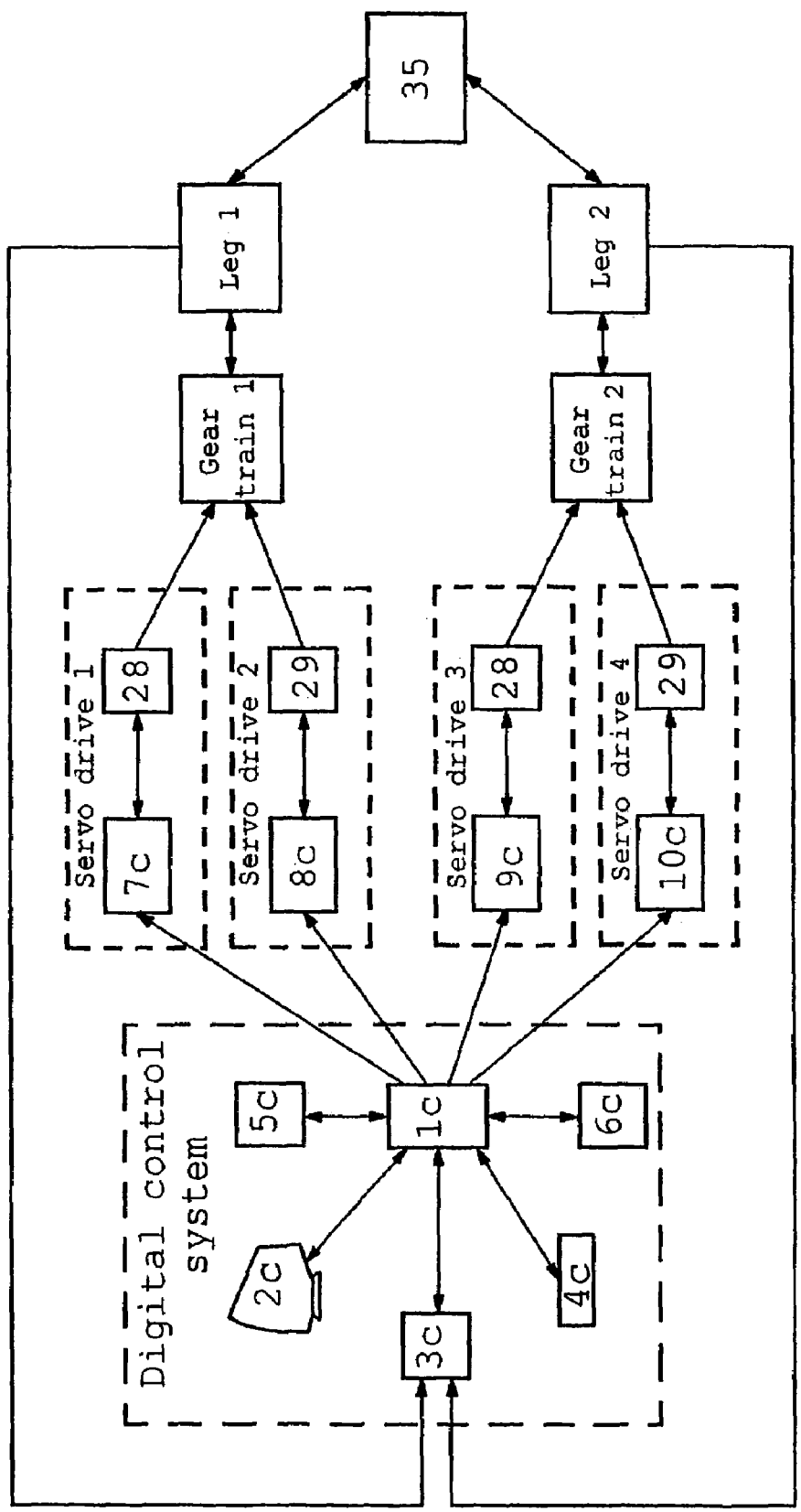
FIG. 25 is a block diagram of a control system as applicable with any of the first five described embodiments.

Referring to FIG. 25, a control system applicable to the embodiments having two legs B, each being driven by two motors, is shown. The main components of the control system are listed in Table 2. The control system includes digital hardware, and four servo-drives.

The digital hardware includes a central processor 1c, connected to the four servo-drives and sending control signals thereto according to the prescribed control algorithms for the manipulating device A. All other components of the digital hardware described in the following are in communication with the central processor 1c. A monitor 2c and a keyboard 4c are used for online programming and servicing of the device by the operator. Internal memory 5c is used for the functioning of the central processor 1c of the computer, and peripheral memory 6c, which may include a CD drive or any information-storage device, is used for uploading control programs according to the intended task.

Finally, an input/output unit 3c is necessary for feedback from each leg B to the control system 1c in operation.

Each servo-drive includes a servo-control unit 7c,8c,9c,10c and a motor 28,29. The role of the servo-control unit 7c,8c,9c,10c is to interpret control signals from the central processor 1c and to implement them into the motion of the motors 28,29. Each actuator unit C of the manipulating device A contains two servo-drives, which produce output motions of the unit. These motions pass through gear trains as described in the embodiments above and move two legs B supporting the common moving platform 35.

A similar or equivalent control system can be used for alternative layouts, including embodiments having three or four legs.

The present invention can be used in a number of industries where high-speed pick-and-place operations are required, including, but not limited to, fabrication and packing of planar electronics components, packaging of various products, and bottling. The present invention can also be used in the design of virtual-axis machine tools by mounting a workpiece on a rotating table, commonly known in the art of machine tooling, to provide a second rotation which can become a fifth degree of freedom when combined with the Schönflies motions of the invention.

It will be appreciated that the present invention is not limited to the specific embodiments described herein, which are merely illustrative. For example, the third and the fourth embodiments can be readily transferred to embodiments characterized by orthogonal planes of motion of the passive parallelograms 33 or the passive parallelogram 33 and the passive single link 44. Other modifications and variations will be readily apparent to those skilled in the art. Accordingly, the scope of the invention is deemed to be in accordance with the claims as set forth below.

TABLE 1

Main components of the active and passive units

| No. | Description |
|---|---|
| A | Manipulating device |
| B | Leg |
| C | Actuator unit |
| D | Passive unit |
| 1 | Base |
| 2 | Support frame |
| 3 | Gear of motor shaft #4 |
| 4 | Motor shaft of motor #28 |
| 5 | Central shaft |
| 6 | Speed reducer with reverser |
| 7 | Planet support |
| 8 | Rotating housing or Planet carrier |
| 9 | Speed reducer |
| 10 | Gear of hollow shaft |
| 11 | Hollow shaft |
| 12 | Gear of central shaft |
| 13 | Support bearing |
| 14 | Upper central bearing |
| 15 | Upper sun gear |
| 16 | Thrust bearing |
| 17, 17' | Planet gears |
| 18 | Output shaft |
| 19 | Output shaft |
| 20 | Lower sun gear |
| 21 | Motor shaft of motor #29 |
| 22 | Gear of shaft #22 |
| 23 | Lower intermediate bearing |
| 24 | Thrust bearing housing |
| 25 | Upper intermediate bearing |
| 26 | Lower central bearing |
| 27 | Driving link |
| 28 | Motor |

TABLE 1-continued

Main components of the active and passive units

| No. | Description |
|---|---|
| 29 | Motor |
| 30 | Active parallelogram linkage |
| 31 | Coupler link |
| 32 | Base of passive unit |
| 33 | Passive parallelogram linkage |
| 34 | Passive rotating housing |
| 35 | Common moving platform |
| 36 | Gripper |
| 37 | Workpiece or tool |
| 38 | Output gear |
| 39 | Following gear of reversing gear train |
| 40 | Output gear |
| 41 | Intermediate gear of direct gear train |
| 42 | Following gear of direct gear train |
| 43 | Vertical link |
| 44 | Passive single link |
| 45 | Universal joint of vertical link #43 |
| 46 | Universal joints |
| 47 | Universal joints |
| 48 | Lower active linkage |
| 49, 49 | Output gears |
| 50 | Intermediate gear |
| 51 | Following gear |
| 52 | Intermediate coupler |
| 53 | Pin-joint holder |
| 54 | Pin-joint |

TABLE 2

Main components of the control system

| No. | Description |
|---|---|
| 1c | Central processor |
| 2c | Monitor |
| 3c | Input/output unit |
| 4c | Keyboard |
| 5c | Internal memory |
| 6c | Peripheral memory |
| 7c | Servo-control unit of the first active module |
| 8c | Servo-control unit of the first active module |
| 9c | Servo-control unit of the second active module |
| 10c | Servo-control unit of the second active module |

We claim:

1. A manipulating device for producing Schönflies motions comprising:
a parallel array of at least two legs;
each leg including an actuator unit having first and second ends and producing a pan-tilt motion;
each leg also including a passive unit having first and second ends, the first end of the passive unit being coupled to the first end of the actuator unit such that the passive unit reacts to the pan-tilt motion;
a base connected to the second end of each actuator unit, all second ends having a constant relative position with respect to one another; and
a common end-effector connected to the second end of all passive units such that the common end-effector is provided with a Schönflies motion by the legs, the Schönflies motion being composed of three independent translations and one rotation about an axis of fixed orientation.

2. The manipulating device according to claim 1, wherein each of the legs provides a Schönflies motion having a direction identical to a direction of the axis of fixed orientation.

3. The manipulating device according to claim 1, wherein the pan-tilt motion of each of the actuator units is provided by at least two motors mounted on the base.

4. The manipulating device according to claim 3, wherein the pan-tilt motion of each of the actuator units is provided by the least two motors through a differential mechanism.

5. The manipulating device according to claim 4, wherein the differential mechanism includes first and second sun gears, a torque from one of the at least two motors being transmitted to the first sun gear from a side of the differential mechanism through a first shaft, and a torque from another of the at least two motors being transmitted to the second sun gear from the same side through a second shaft coaxial with the first shaft.

6. The manipulating device according to claim 1, wherein each actuator unit includes a parallelogram linkage coupled to and extending between a rotating housing and the passive unit, the parallelogram linkage being movable with a tilt motion and the rotating housing being rotationally attached to the base to produce a pan motion.

7. The manipulating device according to claim 6, wherein the parallelogram linkage is coupled to the rotating housing through a pair of vertically aligned joints.

8. The manipulating device according to claim 6, wherein the parallelogram linkage is coupled to the rotating housing through a pair of horizontally aligned joints.

9. The manipulating device according to claim 1, wherein at least one of the passive units includes a parallelogram linkage coupled to and extending between a rotating housing and the common end-effector, the parallelogram linkage being movable with a tilt motion and the rotating housing being rotationally attached to the first end of the actuator unit to produce a pan motion.

10. The manipulating device according to claim 9, wherein the parallelogram linkage is coupled to the rotating housing through a pair of vertically aligned joints.

11. The manipulating device according to claim 9, wherein the parallelogram linkage is coupled to the rotating housing through a pair of horizontally aligned joints.

12. The manipulating device according to claim 9, wherein at least one of the passive units includes a rod coupled to and extending between a second rotating housing and the common end-effector, the rod being movable with a second tilt motion and the second rotating housing being rotationally attached to the first end of the actuator unit to produce a second pan motion.

13. The manipulating device according to claim 6, wherein at least one of the passive units includes a second parallelogram linkage coupled to and extending between a second rotating housing and the common end-effector, the parallelogram linkage being movable with a second tilt motion and the second rotating housing being rotationally attached to the parallelogram linkage of the actuator unit to produce a second pan motion.

14. The manipulating device according to claim 13, wherein at least one of the passive units includes a rod coupled to and extending between a third rotating housing and the common end-effector, the rod being movable with a third tilt motion and the third rotating housing being rotationally attached to the parallelogram linkage of the actuator unit to produce a third pan motion.

15. The manipulating device according to claim 1, wherein each leg comprises at least two motors mounted on the base, the Schönflies motion of the common end-effector being provided by the motors through only the at least two legs.

16. The manipulating device according to claim 1, wherein mid-planes of the passive units are orthogonal.

17. The manipulating device according to claim 1, wherein mid-planes of the passive units are parallel.

18. A manipulating device for imparting a four-degree-of-freedom motion to an end-effector, the four-degree-of-freedom motion being composed of three independent translations and one rotation about a first axis of fixed orientation, the manipulating device comprising:
   a parallel array of at least two legs attached to the end-effector;
   each leg including an actuator unit serially coupled to a passive unit;
   each actuator and passive units including a turntable adapted to experience a rotation about a second axis parallel to the first axis;
   each actuator and passive units also including a swing member having a first end attached to the turntable and being adapted to experience a tilt motion so that a second end of the swing member is translated along a perimeter of an imaginary circle lying in a plane parallel to the second axis; and
   each actuator unit being provided with actuating means to provide the rotation of the turntable thereof and the tilt motion of the swing member thereof such as to produce an actuator motion, the actuator motion of each actuator unit causing a passive motion of the passive unit coupled thereto, the passive motion of the passive unit being composed of the rotation of the turntable thereof and the tilt motion of the swing member thereof, such that a combination of the actuator motion with the passive motion produces a leg motion for the corresponding leg;
   whereby a combination of the leg motions imparts the four-degree-of-freedom motion to the end-effector.

19. The manipulating device according to claim 18, wherein each leg motion is a four-degree-of-freedom motion composed of three independent translations and one rotation about a third axis having a same direction as the first axis of fixed orientation.

20. The manipulating device according to claim 18, wherein each of the actuator units is mounted on a base and the actuating means of each of the actuator units comprises at least two motors mounted on the base.

21. The manipulating device according to claim 20, wherein for each actuator the at least two motors provide the rotation of the turntable and the tilt motion of the swing member through a differential mechanism.

22. The manipulating device according to claim 21, wherein the differential mechanism includes first and second sun gears, a torque from one of the at least two motors being transmitted to the first sun gear from a side of the differential mechanism through a first shaft, and a torque from another of the at least two motors being transmitted to the second sun gear from the same side through a second shaft coaxial with the first shaft.

23. The manipulating device according to claim 18, wherein for each leg, the turntable of the actuator unit is a rotating housing rotationally attached to a base, and the swing member of the actuator unit is a parallelogram linkage having a first end thereof coupled to the rotating housing and a second end thereof coupled to the passive unit.

24. The manipulating device according to claim 23, wherein the parallelogram linkage is coupled to the rotating housing through a pair of vertically aligned joints.

25. The manipulating device according to claim 23, wherein the parallelogram linkage is coupled to the rotating housing through a pair of horizontally aligned joints.

26. The manipulating device according to claim 18, wherein for at least one leg, the turntable of the passive unit is a rotating housing rotationally attached to the actuator unit, and the swing member of the passive unit is a parallelogram linkage having a first end thereof coupled to the rotating housing and a second end thereof coupled to the end-effector.

27. The manipulating device according to claim 26, wherein the parallelogram linkage is coupled to the rotating housing through a pair of vertically aligned joints.

28. The manipulating device according to claim 26, wherein the parallelogram linkage is coupled to the rotating housing through a pair of horizontally aligned joints.

29. The manipulating device according to claim 26, wherein for at least one leg, the turntable of the passive unit is a rotating housing rotationally attached to the actuator unit, and the swing member of the passive unit is a rod having a first end thereof coupled to the rotating housing and a second end thereof coupled to the end-effector.

30. The manipulating device according to claim 23, wherein for at least one leg, the turntable of the passive unit is a second rotating housing rotationally attached to the parallelogram linkage of the actuator unit, and the swing member of the passive unit is a second parallelogram linkage having a first end thereof coupled to the second rotating housing and a second end thereof coupled to the end-effector.

31. The manipulating device according to claim 30, wherein for at least one leg, the turntable of the passive unit is a third rotating housing rotationally attached to the parallelogram linkage of the actuator unit, and the swing member of the passive unit is a rod having a first end thereof coupled to the third rotating housing and a second end thereof coupled to the end-effector.

32. The manipulating device according to claim 18, wherein each of the actuator units is mounted on a base, and the actuating means of each actuator unit comprise at least two motors mounted on the base, the four-degree-of-freedom motion of the end-effector being imparted by the motors through only the at least two legs.

33. The manipulating device according to claim 18, wherein mid-planes of the passive units are orthogonal.

34. The manipulating device according to claim 18, wherein mid-planes of the passive units are parallel.

* * * * *